United States Patent [19]

Ruehle et al.

[11] 4,298,968
[45] Nov. 3, 1981

[54] DIGITAL REFLECTION SEARCHING AND SECTION PLOTTING

[75] Inventors: William H. Ruehle, Duncanville; John D. Hodge, Dallas, both of Tex.

[73] Assignee: Mobil Oil Corporation, New York, N.Y.

[21] Appl. No.: 777,806

[22] Filed: Mar. 15, 1977

Related U.S. Application Data

[63] Continuation of Ser. No. 863,766, Oct. 2, 1969, abandoned, which is a continuation of Ser. No. 696,661, Jan. 9, 1968, abandoned, which is a continuation of Ser. No. 607,123, Dec. 13, 1966, abandoned, which is a continuation-in-part of Ser. No. 516,609, Dec. 27, 1965, abandoned.

[51] Int. Cl.³ .............................................. G01V 1/30
[52] U.S. Cl. ....................................... 367/59; 367/63; 367/74; 364/421
[58] Field of Search ............... 340/15.5 FC, 15.5 DP, 340/15.5 MC, 15.5 DS; 367/74, 60, 63, 30, 68, 59; 364/421

[56] References Cited

U.S. PATENT DOCUMENTS

| | | | |
|---|---|---|---|
| 2,427,421 | 9/1947 | Rieber | 340/15.5 |
| 3,149,302 | 9/1964 | Klein et al. | 340/15.5 |
| 3,149,303 | 9/1964 | Klein et al. | 340/15.5 |
| 3,284,765 | 11/1966 | Bratton et al. | 340/15.5 |

OTHER PUBLICATIONS

Jakosky, *Exploration Geophysics*, Trija Publishing Co., Calif., 2nd et ed. c. 1940, pp. 679–688.

*Primary Examiner*—Howard A. Birmiel
*Attorney, Agent, or Firm*—George W. Hager; Michael G. Gilman; Charles A. Huggett

[57] ABSTRACT

The specification describes methods of and apparatus for converting seismic data to migrated seismic depth sections. The apparatus includes a curve follower for following lines of continuity on seismic time sections which represent reflections from particular subsurface interfaces. The curve follower generates signals representing occurrence times and horizontal distances at successive increments along the lines of continuity. These signals are applied to a digital computer which performs a migration operation and generates signals representing the attitude, actual depth and horizontal displacement of successive points on the interfaces. An automatic plotter plots reflection segments at the correct attitude, actual depth and horizontal displacement to produce the migrated seismic depth section.

18 Claims, 20 Drawing Figures

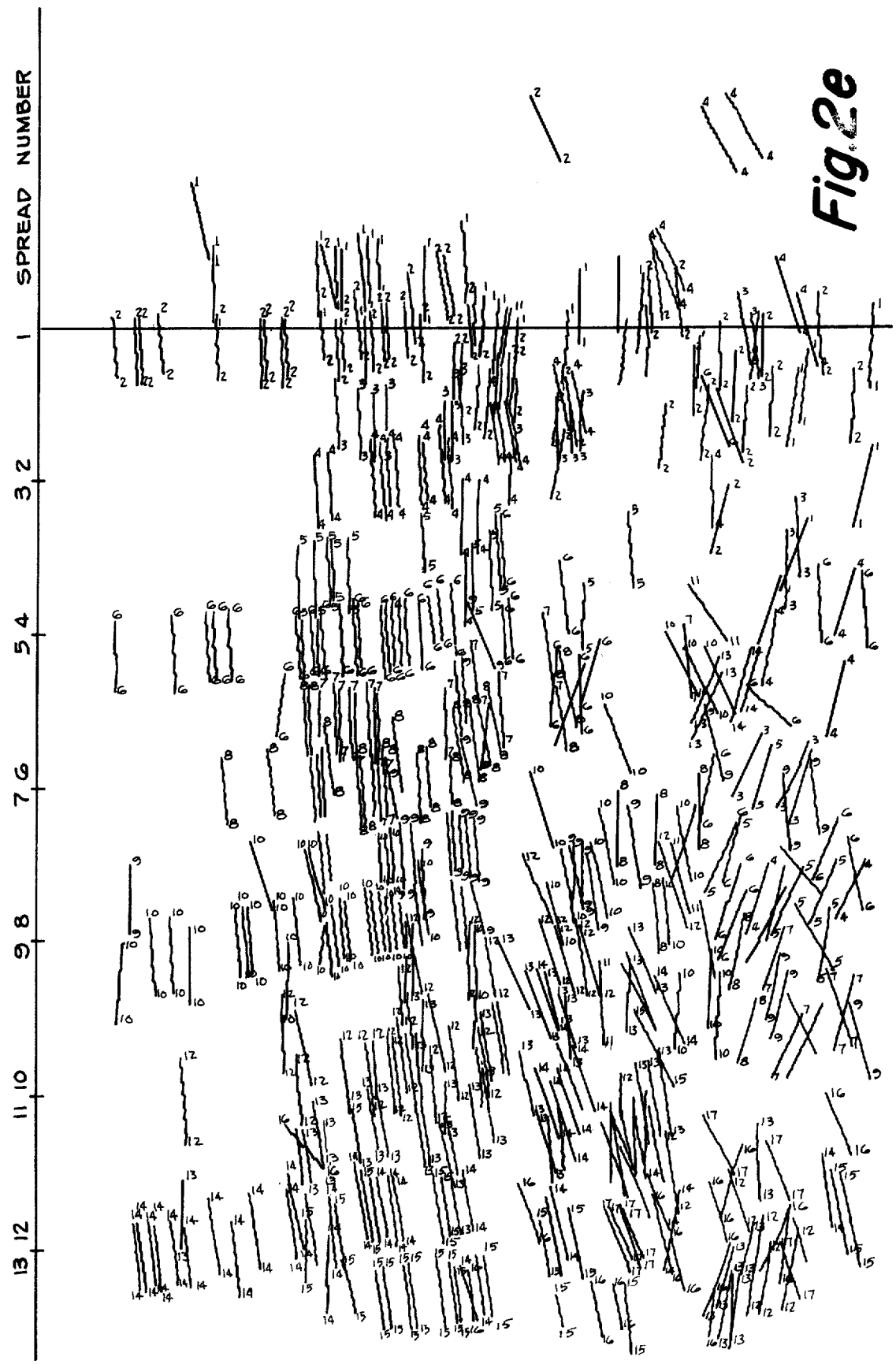

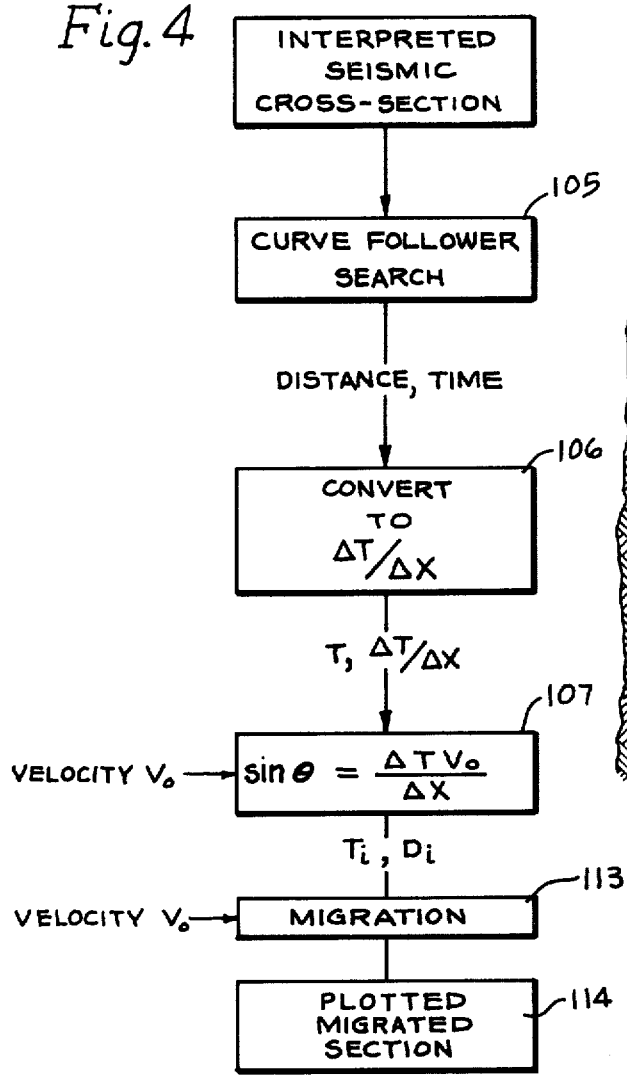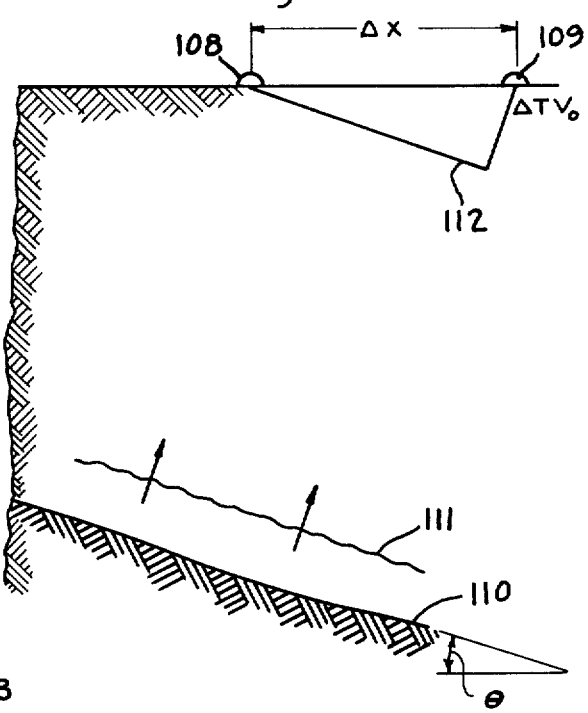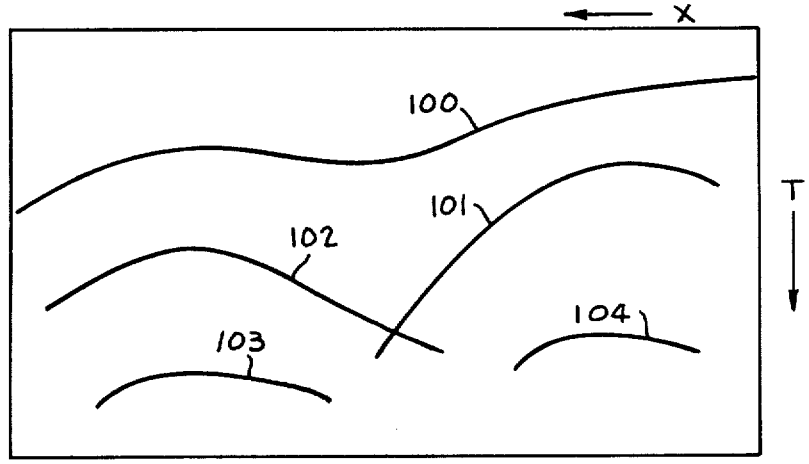

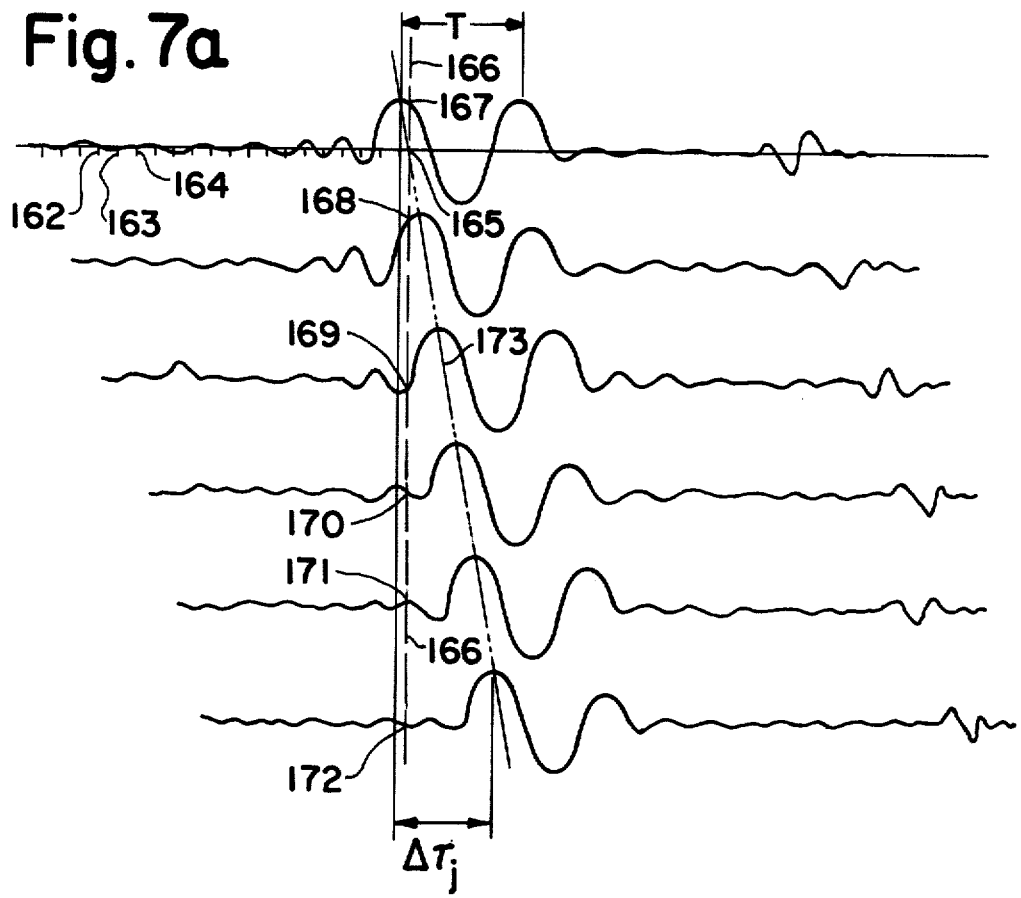
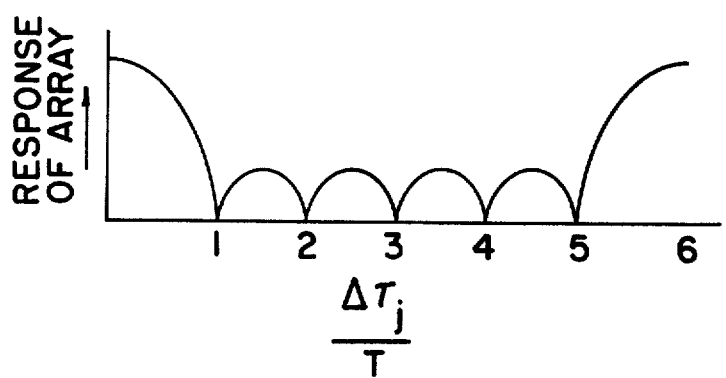

DIGITAL REFLECTION SEARCHING AND SECTION PLOTTING

This application is a continuation of application Ser. No. 863,766, filed Oct. 2, 1969, now abandoned, which was a continuation of application Ser. No. 696,661, filed Jan. 9, 1968, which was a continuation of application Ser. No. 607,123, filed Dec. 13, 1966, which was a continuation-in-part of application Ser. No. 516,609, filed Dec. 27, 1965, now abandoned.

This invention relates to a method and apparatus for determining the presence and location of reflections on seismograms.

In seismic prospecting, seismic energy is generated at a shot point, for example, by a shot of dynamite or by thumping. This seismic energy is reflected from subsurface interfaces and detected at a spread of geophones. The geophpone signals provide an array of seismic traces which are commonly digitized and recorded on magnetic tapes. These traces contain information which can be used to represent the characteristics of the subsurface formations.

Primary reflections of seismic energy on a trace indicates the presence of a subsurface reflecting interface, and the time occurrence of this primary reflection on the trace represents the depth of the reflecting interface from the surface. Furthermore, the time shift, or attitue, of a primary reflection from trace-to-trace indicates the dip, or slope of the subsurface interface. Skilled seismic interpreters can sometimes determine the location of dip of subsurface interfaces directly from the seismogram. However, this requires a large mount of judgment, it is time-consuming, and sometimes inconsistent results are obtained.

It is an important object of the present invention to automatically select the time occurrence of primary reflections on seismic traces and determine the dip of the reflecting interface producing the primary reflections.

It is another object of the present invention to produce a migrated seismic cross-section directly representing the earth's layering of subsurface formations.

It is another object of the present invention to determine the presence of multiple reflections and to reject these multiple reflections before they are plotted.

It is another object of the present invention to obtain static and weathering corrections to be applied to the seismic section.

It is another object of the present invention to convert seismic time sections on which interfaces have been marked with lines of continuity to migrated seismic depth sections.

It is another object of the present invention to convert seismic data to migrated seismic depth sections which have continuous plots of reflections obtained from the same reflecting interface.

It is another object of the present invention to provide search techniques for determining the depth, dip and amplitude of reflections represented by a plurality of seismic traces.

In accordance with one embodiment of the invention, the amplitudes of the traces are adjusted so that the rms energy is equal for all traces. This insures that the amplitudes of reflections will not vary from trace-to-trace because of the differences in sensitivity of the instruments or distance from the shot point. Next, a particular trace is searched for all reflections having an amplitude greater than a threshold level. The time occurrences of all reflections having an amplitude greater than the threshold level are stored as possible primary reflections.

Next, all traces adjacent to a particular trace are searched to find the same primary reflection on adjacent traces. This search is performed by selecting the amplitude of adjacent traces along search lines which have differing moveouts from trace-to-trace; that is, the search lines occur at various attitudes to determine the presence of dipping reflections. The amplitudes of selected portions of adjacent traces are summed along each search line. The sum having the maximum value indicates the search line having an attitude indicating the dip of the subsurface formation producing that particular primary reflection.

The maximum sum is divided by the number of traces in the array to determine the mean amplitude of the primary reflections along this search line. This mean amplitude is compared with a threshold to determine if the energy along this search line is high enough to indicate the presence of a primary reflection. If the mean amplitude exceeds the threshold, the reflections are selected as being primary reflections but otherwise they are rejected. The occurrence time on the particular trace, the attitude of the search line and the magnitude of the mean sum are stored as parameters of the reflection which has been selected.

From the stored values of the occurrence time of the reflection, from the seismic velocity of the earth formations, and from the attitude of the reflecting interface, the actual vertical depth of the reflecting interface can be computed. Simultaneously, the horizontal step-out of the reflecting point from the point at which the trace was obtaind can be determined. This is done by obtaining a running computation of computed time by incrementally increasing depth. When this computed time corresponds with the stored occurrence time, the corresponding value of depth is equal to the actual depth of the reflecting point. Simultaneously, a running computation of horizontal step-out is obtained. The actual horizontal step-out is selected as being equal to the step-out obtained from the computation made with the simultaneously determined actual value of depth.

The reflecting interface is plotted by the plot of a line at the actual depth and actual horizontal step-out of the reflecting surface. The line is inclined at the attitude determined for the primary reflection. This process is repeated for all reflections on the seismic traces so that there is ultimately plotted a migrated seismic cross-section which can be easily interpreted and which is directly indicative of the earth's layering at the subsurface formations.

In accordance with another aspect of this invention, multiple reflections may be determined and removed. This is accomplished by summing the stored times of reflections to obtain all possible combinations of the sums of these times. Also, the stored values of attitude are summed to obtain all possible combinations of the sums of these attitudes. The sums of time and attitude are taken in parts and compared with pairs of the stored values of time and attitude. When there is a correpondence between a pair of sums and a pair of stored values of time and attitude, there is an indication that the stored values of time and attitude represent a multiple reflection. Accordingly, this pair is rejected.

In accordance with another aspect of this invention, the arrival times of a given reflection across an array of traces are considered as a time series. The static and weathering errors in this series are represented by the high frequency components. By applying the series to a smoothing operator, the high frequency components are removed, leaving the low frequency components which are indicative of geological structure and lithology. To obtain the correction to be applied to the original seismic traces, the difference between the smoothed series and original series is obtained for each trace. This differene is used to shift the trace to the proper direction to eliminate the error.

In accordance with another aspect of this invention, each of the values indicative of time occurrence and dip are compared to a predicted value of time occurrence and dip to determine whether reflections from energy from two adjacent shot points are from the same reflecting interface. If there is correspondence between the predicted values and the actual values, an indication of continuity is obtained and the reflections are plotted as a continuous line on the final depth section. In this manner there is obtained a plot wherein continuous lines represent continuous reflecting interfaces in the earth.

In accordance with a still further aspect of the invention, a modification is provided for searching the seismograms for reflections. In accordance with this invention, the summations along various search lines are performed at each sampling interval rather than only where there is an indicated reflection on a key trace. This modification insures that all reflections will be picked and plotted even if the reflection is of a poor quality on the key trace. An improvement in the number of of reflections plotted and in the signal-to-noise ratio is obtained in this manner.

The foregoing and other objects, features and advantages of the present invention will be better understood from the following more detailed description and appended claims in conjunction with the drawings in which:

FIG. 2e shows a complete migrated depth section plotted in accordance with the present invention;

FIG. 4 shows a block diagram of a modification of the invention;

FIG. 4b is an idealized representation of the lines of continuity drawn on a seismic time section;

FIG. 5 shows the wave front of seismic energy reflected from a dipping interface;

FIG. 7a shows reflections on seismic traces;

FIG. 8 shows the response of an array providing a better understanding of the improved results of the FIG. 7 modification.

Before proceeding with a detailed description of the process, the invention will be described with reference to the figures showing ray paths of seismic energy producing the traces of the seismogram, and with reference to the traces themselves.

Figure 2A:
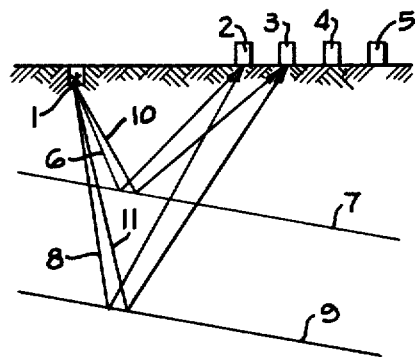
FIG. 2a depicts a geohpone spread and seismic energy traveling through the subsurface formations to the geophone spread.

There is shown in FIG. 2a a field layout including the shot of dynamite 1 and a geophone array including geophones 2, 3, 4 and 5. It will, of course, be understood that many more geophones will usually be employed in a spread. In one common arrangement twelve geophones are disposed on each side of the shot. Further, the usual location for seismic prospecting is to shoot in one location with a spread, then to shoot in another location in proximity to a second spread, and to continue shooting in proximity to spreads located at different points on the surface. In this manner, there is obtained seismograms which represent the subsurface characteristics.

As shown in FIG. 2a, the seismic energy travels through ray path 6, is reflected from the subsurface reflecting interface 7 and detected by geophone 2. The seismic energy also travels by ray path 8, is reflected from the subsurface reflecting interface 9 and forms a second primary reflection in the trace produced by geophone 2.

Each of the other geophones will produce a trace having primary reflections from the interfaces 7 and 9. The seismic energy from the shot travels over ray paths 10 and 11 to produce primary reflections from interfaces 7 and 9 on the traces produced by geophone 3. Note that the ray paths 10 and 11 are longer than the ray paths 6 and 8. Hence, the primary reflections on the trace from geophone 3 will occur at later occurrence times than the corresponding primary reflections on the trace produced by geophone 2. One cause for this later occurrence time is, of course, normal movement. That is, the geophone 3 is further from the shot than the geophone 2. A normal moveout correction can be applied to the traces to compensate for this. The occurrence times of primary reflections on the trace from geophone 3 are later for another reason. This is that the interface 7 and 9 are dipping formations. It is very important to the geophysicist to determine the dip of these formations. The later occurrence times of the primary reflections from trace-to-trace indicate this dip to the geopysicist.

Figure 2B:
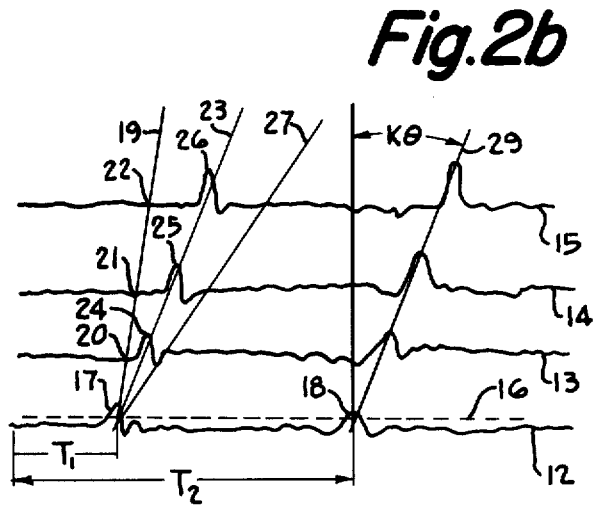
FIG. 2b depicts an array of seismic traces having primary reflections thereon.

There is shown in FIG. 2b a seismogram including traces 12, 13, 14 and 15 produced, respectively, by the geophones 2, 3, 4 and 5. There is indicated on each trace two primary reflections produced by the reflection of seismic energy from subsurface interfaces 7 and 9. Conventional corrections have been applied to each of the traces; that is, they have been corrected for normal moveout and weathering in accordance with well-known techniques.

The first step in the process of this invention entails a determination of the rms energy in each of the traces. The amplitudes of the respective traces are each adjusted so that the rms energy is equal in each trace. This insures that the amplitudes of all reflections in the traces will be functions solely of the reflection coefficient of the reflecting interfaces producing them. That is, variations due to difference in the sensitivity of the instruments producing the traces or variations due to the differences in the distances from the shot point will be obviated. Next, a particlar trace is selected as a reference trace, also referred to as the key trace. Most commonly, this will be the trace 12 produced by geophone 2 in close proximity to the shot point since the weathering and elevation with respect to the shot are most accurately known for this trace. The reference trace 12 is compared to a threshold level to pick all amplitudes which exceed the threshold level. As shown in FIG. 2b, the threshold level 16 is exceeded by the two primary reflections 17 and 18. The times for these amplitudes are stored as being indicative of possible primary reflections. That is, the time $T_1$ of reflection 17 is stored, and the occurrence time $T_2$ of reflection 18 is stored. These occurrence time $T_1$ and $T_2$, are, of course, indicative of the depth of the reflecting interfaces producing them and will later be used to produce a plot indicating the actual depths of these interfaces.

Next, the adjacent traces are searched along search lines having different attitues in order to determine the presence of dipping reflections. At each of the stored occurrence times, the adjacent traces are sampled at different time shifts with respect to the occurrence time. For example, starting at occurrence time $T_1$, the adjacent traces are first sampled along search line 19. The trace 13 is sampled at 20; the trace 14 is sampled at 21; the trace 15 is sampled at 22. The amplitudes of all of these samples are summed. Next, the traces are searched along search line 23 and the amplitudes 24, 25, nd 26 are summed. Next, the adjacent traces are sampled along search line 27 and the amplitudes obtained are summed. These sums are compared to determine which sum has the largest magnitude. Of course, the sum obtained along the search line 23 will have the largest magnitude in this instance. The search line 23 has an attitude which is indicative of the dip of the subsurfaces reflecting interface producing the first primary reflections on the traces.

The maximum sum obtained along the search line 23 is divided by the number of traces in order to determine the mean amplitude along this search line. This mean amplitude is compared with a second threshold. If it is greater than the second threshold, there is an indication that energy exists across the seismogram at the occurrence time $T_1$ on trace 12 and at the attitude of the search line.

Occurrence time $T_1$ and the attitude of search line 23 are stored as a pair of values indicative, respectively, of the actual depth and dip of the reflecting interface producing the primary reflections. The mean amplitude of the sum is also stored as a parameter indicative of the reflection coefficient of the interface producing these primary reflections.

The search for dipping reflections is repeated at each of the stored occurrence times. For example, the search is made along search lines with different attitudes at the occurrence time $T_2$. Again, the attitude of the search line producing a maximum is stored together with the occurrence time $T_2$. The occurrence time $T_2$ and the attitude of the maximum search line are stored as a pair of values indicative, respectively, of the depth and dip of the reflecting interface 9 producing the primary reflections across the array of traces. Hereinafter, the stored values of occurrence times will be referred to as the T-array and the stored values of attitude will be referred to as the D-array.

Having obtained a stored T-array and a stored D-array, there has been provided a method of determining the presence and location of reflections on seismograms and a method of indicating the dip of the interface producing the reflections.

The method of this invention may be extended to the plotting of a migrated seismic cross-section directly representative of the earth's layering of the subsurface formations. In order to do this, the stored T- and D-arrays are used as input parameters in a determination of horizontal displacement and vertical depth of the sections of the reflecting interfaces.

Figure 2C:
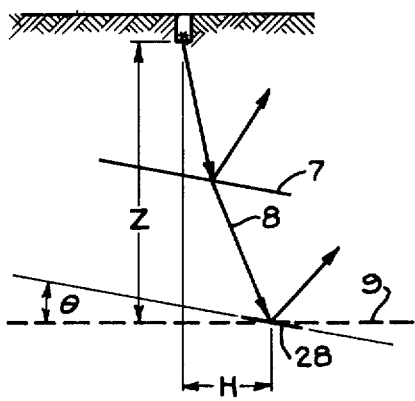
FIG. 2c shows the actual depth and horizontal displacement and dip of a subsurface reflecting point.

Referring to FIG. 2c, there is shown in more detail the ray path 8 which is reflected from reflecting interface 9 and detected by geophone 2. This ray path is reflected from the segment 28 of the reflecting interface 9. The segment 28 is at an actual vertical depth Z from the point at which the seismic energy was generated. The segment 28 has a horizontal displacement H with respect to the point at which th seismic energy was generated. The attitude of the dipping reflecting interface 9 with respect to horizontal is $\theta$.

In order to plot the reflecting segment 28 on a migrated seismic cross-section, it is necessary to determine Z, H and $\theta$.

The occurrence time of a primary reflection on a sesimogram is related to the depth of the reflecting interface by the following formula:

$$T = 2 \int_O^Z \frac{dz}{v\sqrt{1 - (pv)^2}}$$

where

T is the occurrence time of the reflection on the trace,
Z is the actual depth of the reflecting interface,
z is incremental depth,
v is seismic velocity of the earth, and
p is equal to sin $\theta_i/v_i$
where:
  $\theta_i$ is the attitude of a reflecting bed at any particular depth, and
  $v_i$ is the seismic velocity at this particular depth.

The above is obtained from well-known principles of reflection seismology. The derivation of this formula is shown, for example, in *Exploration Geophysics*, J. J. Jakosky, pages 679, 688.

In order to determine actual depth Z, a running computation of time is made by incrementally increasing z in accordance with the above equation. As this running computation is made, the value of T, in the above formula, is compared with the stored occurence time, for example, the time $T_1$. When the value of T from the running computation equals the stored value $T_1$, the incremental value of z is the desired actual depth Z of the reflecting interface.

Having determined Z from the above computation, the horizontal displacement H can be computed from the following:

$$H = \int_O^Z \frac{pvdz}{\sqrt{1 - (pv)^2}}$$

where:
H is the horizontal displacement, and the other parameters are as previously defined.

Usually it is desirable to make a running computation of H with increasing incremental values of z simultaneously with the first-mentioned running computation of time T. Therefore, when the actual vertical depth Z is determined in the first running computation, the horizontal displacement can be determined from the second running computation as the value of H at that time.

There has now been determined the actual vertical depth Z and horizontal displacement H of the segment 28 in FIG. 3c. Furthermore, the value of $\theta$ can be directly determined from the attitude of search line 29 in FIG. 2b. The attitude of the search line which produces the maximum sum is directly proportional to the attitude of $\theta$ of the reflectoing segment 28. As has been indicated in FIG. 2b, the attitude of the search line 29 is equal to a constant K multiplied by $\theta$.

Another technique for obtaining horizontal displacement H and vertical depth Z, that is, for performing the migration step, is by a geometrical optics approximation of these parameters. This approximation makes use of Snell's law:

$$\sin \theta_1/v_2 = \sin \theta_2/v_2 = \ldots = \sin \theta_i/v_i$$

By interpolation, an approximation can be made of the interval velocity over equidepth sections of the earth. By use of Snell's law, the acoustic ray path angle in each of these depth intervals can be computed and, hence, the horizontal displacement of the ray between the top of the interval and the bottom of the interval can be computed. The travel time over each depth interval can be determined from the assumed interval velocity. The interval travel times over successive depth intervals are summed until there is a correspondence with the occurrence time of the reflection on the trace, that is, T. When this correspondence is achieved, the sum of the horizontal displacements over each of the successive intervals is the horizontal displacement H. The summation of the depth intervals is the actual depth Z.

This technique can be summarized as follows:

Velocity Data Input $$\begin{pmatrix} T_1(i) \\ Z_1(i) \end{pmatrix} \text{ or } \begin{pmatrix} T_1(i) \\ V_1(i) \end{pmatrix} \text{ or } \begin{pmatrix} Z_1(i) \\ V_1(i) \end{pmatrix}$$

Resample Velocity
compute times for
equal depth intervals
Interpolate Velocity
Array Compute Isovelocity
Surfaces $$T(j) = T_i + \frac{\Delta T}{\Delta Z} Z_i$$

$Z(j)$, fixed $$V_{ij} = \frac{\Delta Z_{ij}}{\Delta T_{ij}}$$

$$\theta_{ij} = -ATAN \frac{\Delta Z_{ij}}{\Delta X} + \pi$$

Migrate
Reflections $t_{kl}, D_{kl} \longrightarrow$ $$RAY(1) = \sin \theta_0(1) \frac{V_{kl}}{V_{0kl}}$$

DEPTH (1) = $Y(1) + \Delta y$
HORZ(1) = $X(1) + \Delta X$

HORZ(k, l)
DEPTH (k, l)
ALPHA(k, l)

$\downarrow$

Figure 2D:
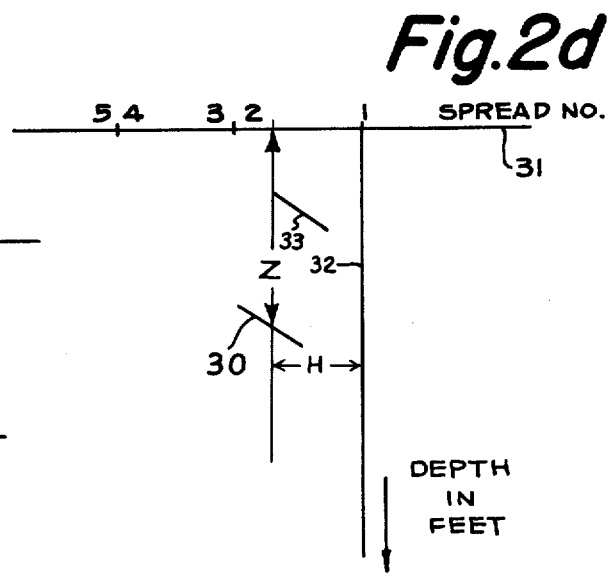
FIG. 2d shows two reflecting points for a migrated seismic section plotted in accordance with this invention.

Having obtained horizontal displacement H and actual depth Z, the reflecting segment 28 can now be plotted directly on a migrated seismic section. A portion of such a section is shown in FIG. 2d. In order to represent the reflecting segment 28, a line 30 is plotted on FIG. 2d. This line is plotted at a distance from the horizontal line 31 proportional to actual vertical distance Z. The line is plotted at a distance from the vertical line 32 proportional to the horizontal displacement H. Furthermore, the line 30 is plotted with an inclination corresponding with the attitude $\theta$. $\theta$ can be directly determined from the attitude of the search line 29 in FIG. 2b.

In a similar manner, the segment of reflecting interface 7 can be plotted on FIG. 2d after determination of its actual depth, horizontal displacement and attitude. This segment is shown plotted in FIG. 2d as the line 33. The plotting of these lines is performed automatically by a plotter and, of course, the determination of the depth, horizontal displacement and attitude of the reflecting segment is carried out automatically. The process is repeated for a number of seismograms obtained from a plurality of spreads. When this has been done, there is produced a migrated seismic cross-section, such as that shown in FIG. 2e.

Each of the line segments on FIG. 2e is identified by a number representing the spread from which it was obtained. As is shown in FIG. 2e, the spread locations are indicated across the top horizontal line with the reflecting segments shown drawn in at the proper depth, horizontal displacement and attitude with respect to the spread from which it originated. Such a migrated seismic cross-section is directly indicative of the earth's layering. Furthermore, it directly shows the depth and dip of subsurface beds and interfaces. Such a presentation which is produced automatically with this invention is an invaluable aid to the seismologist.

Figure 2F:
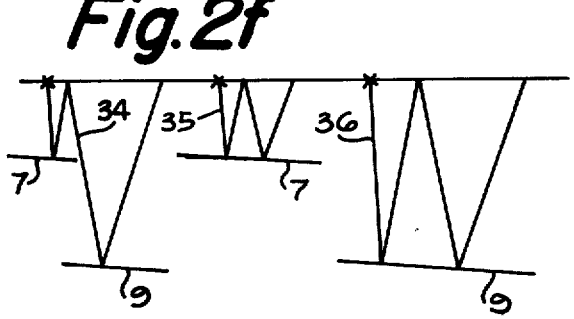
FIG. 2f shows three types of multiple reflections.

In accordance with another aspect of the present invention, provision is made for removing multiple reflections from the seismograms so that these multiple reflections are not plotted as reflecting segments on the migrated seismic cross-section. As will be understood, there are numerous multiple reflections in a seismogram. Three types of possible multiple reflections are shown in FIG. 2f. These are the first order surface multiples (FOSM) for the surface and two subsurface reflecting interfaces. The multiple 34 is reflected from interface 7, it is reflected from the surface, and it is reflected from interface 9 before being detected at the geophone. The multiple 35 is reflected from interface 7 twice before being detected at the geophone, and the multiple 36 is reflected twice from interface 9 before being detected at the geophone.

For the purpose of this explanation, the occurrence time of the multiple 34 on the seismogram will be denoted $T_{34}$. Similarly, the occurrence time of multiple 35 will be denoted $T_{35}$; and the occurrence time of multiple 36 will be denoted $T_{36}$. These times are related to the occurrence times of the primary reflections following the ray paths 6 and 8 in FIG. 2a. For the purpose of this explanation, the occurrence times of these two primaries will be denoted $T_6$ and $T_8$, respectively. The values of $T_6$ and $T_8$, which are the stored values of occurrence times as previously discussed, are added together to obtain all combinations of the sums of these times. For simplicity, we will assume that the following are all possible combinations of sums of the occurrence times:

$T_6 + T_8$
$T_6 + T_6$
$T_8 + T_8$

These sums are compared with all of the stored values of occurrence times. Note that in this comparison, there will be a correspondence between $T_{34}$ and the sum $T_6+T_8$. Accordingly, $T_{34}$ is identified as a multiple reflection. Similarly, there will be a correspondence between $T_{35}$ and the sum $T_6+T_6$. $T_{35}$ is thus identified as a multiple reflection. Similarly, there is a correspondence between $T_{36}$ and the sum $T_8+T_8$. This identifies $T_{36}$ as a multiple reflection.

In order to positively identify multiple reflections, the comparison step is also performed between the stored values of attitude and all possible combinations of the sums of the attitudes.

The attitude of multiple reflection 34 across the array of traces will appear to have a dip which is equal to the attitude of reflecting interface 7 plus the attitude of reflecting interface 9. The multiple reflections 35 will appear to have a dip equal to twice the dip of interface 7; and the multiple reflections 36 will appear to have a dip equal to twice the attitude of interface 9.

Assume that the attitude of reflecting interface 7 is denoted $D_7$ and the attitude of reflecting interface 9 is denoted $D_9$. These are values which have been stored in the D-array as has previously been discussed. All possible sums of the values stored in the D-array are taken thereby producing the following sums:

$D_7+D_9$
$D_7+D_7$
$D_9+D_9$

When these sums are compared with the stored values in the D-array, correspondence will be produced between $D_{34}$ and $D_7+D_9$. Similarly; there will be correspondence between $D_{35}$ and $D_7+D_7$; and there will be correspondence between $D_{36}$ and $D_9+D_9$. Accordingly, the reflections producing the stored values $D_{34}$, $D_{35}$ and $D_{36}$ are identified as multiple reflections and are rejected.

In accordance with the present invention, the comparison and rejection operation is carried out in pairs of stored values of time and attitude. That is, the sums of $T_6+T_8$ and $D_7+D_9$ are compared with all pairs of values in the T- and D-arrays. In this comparison, correspondence will be produced between this pair of sums and the values $T_{34}$ and $D_{34}$. Accordingly, this pair, identifying a particular reflection, has been positively identified as a multiple reflection and it will be rejected. By making the comparison with pairs from T- and D-arrays, there has been provided a technique for positively identifying and rejecting multiple reflections.

In accordance with still another aspect of this invention, there is provided a method for correcting seismic data for topography and weathering. The weathering layer at the surface of the earth has seismic velocity characteristics which are quite different from the rest of the subsurface formations. Also, this weathering layer varies in thickness. Both of these factors lead to errors in occurrence times of reflections on the traces. Therefore, the traces must be time-corrected for weathering. Also, there are variations in the elevation of the geophones above a datum plane which are usually not precisely known. It is necessary to make these static corrections for elevation, or topography.

Figure 2G:
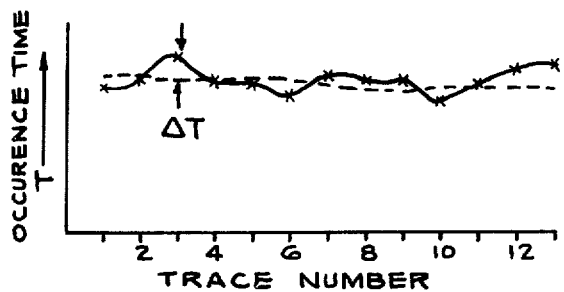
FIG. 2g shows a time series for a reflection across an array of traces.

In accordance with this invention, there is provided atechnique for obtaining the corrections to be applied to the traces of the seismogram. The occurrence time of each primary reflection on each trace is determined in accordance with the techniques previously described. These reflection times form a time series with respect to trace number. Such a time series is shown in FIG. 2g. The high frequency components of this time series represent the static and weathering errors. This time series is applied to a low-pass digital filter, which is often referred to as a smoothing operator. After the time series has been smoothed, it takes the form of a dashed line shown in FIG. 2g. The difference between the unsmoothed reflection (the solid line) and the smoothed series (the dashed line) at each particular trace number is the static correction which is to be applied to that trace to correct for weatherin and topography variations. This difference is used to shift the trace with respect to time in the proper direction to eliminate the error. For example, the correction $\Delta T$ is applied to trace 3 as a correction.

Figure 1:
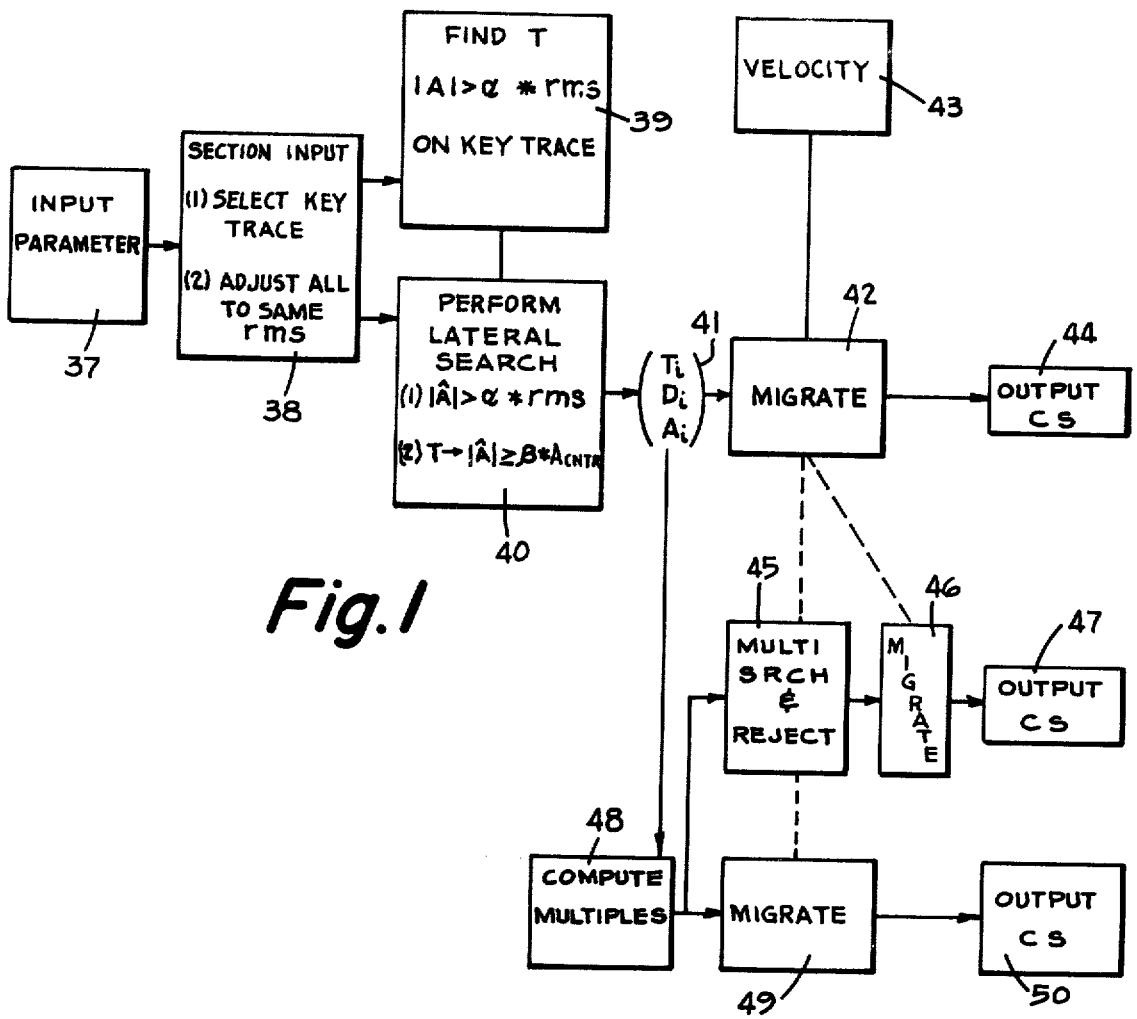
FIG. 1 is a flow sheet of the process carried out in accordance with the present invention.

The flow diagram for the digital computer program for carrying out the method of this invention is shown in FIG. 1. As indicated at 37 the input parameters to the program are fed into the computer. These parameters are spread length, number of samples in each trace and other parameters which will later be described in detail.

The section input instructions, indicated at 38, control the input of the traces into the computer and loading them into an array. These instructions control the selection of the key trace, or particular trace, which will usually be the trace from the geophone adjacent the shot. This group of instructions also adjusts all input traces to the same rms energy level. The group of instructions indicated at 38 supplies the group of instructions indicated at 39 with the key trace. The group of instructions at 39 compares the amplitude on the key trace to a threshold level which is set equal to $\alpha$ times the value of the rms amplitude on the key trace. The occurrence times T having an amplitude $|A|$ exceeding $\alpha$ multiplied by the rms level are stored.

In accordance with the instructions indicated at 40, the lateral search is performed on adjacent traces. The occurrence time T on the key trace is used to locate the search line producing a maximum sum across the traces. The maximum sum is divided by the number of traces to compute the maximum mean sum denoted $|\hat{A}|$. In order to insure that the maximum sum is truly indicative of a set of primary reflections across the traces, two tests are applied to the maximum mean sum and it is accepted as being indicative of a primary reflection only if it meets both of these tests.

The first criterion is that the maximum mean sum amplitude must be greater than the original threshold that was set for reflections on the center trace. As indicated at 40, this means that $|\hat{A}|$ must be greater than $\alpha$ * rms. (In FIG. 1, * denotes multiplication in accordance with standard Fortran notation.) Furthermore, another criterion is applied. This is that the mean amplitude must be above some fraction of the amplitude on the key trace. That is, the mean amplitude is compared with the threshold $\beta$*'Acntr, where Acntr is the amplitude of the pulse on the key trace and $\beta$ is the desired fraction of this amplitude, and the means amplitude must be equal to or greater than this threshold or it is rejected. The reason for applying this test is to insure that the search line has selected amplitudes which are fairly constant across all traces. All traces have een set to the same rms amplitude level so that reflections should have approximately the same amplitude across the traces. However, if in selecting a reflection on the key trace, a noise pulse of large amplitude is selected, it may still be possible to obtain a mean amplitude across all traces which has a level exceeding the threshold α* rms. However, if this mean amplitude is not some fraction of the amplitude of the pulse on the key trace, then the criterion determines that it is not a reflection and it is rejected.

The lateral search instructions 40 provide an output for three arrays; these are the time arry $T_i$, the dip array $D_i$, and the amplitude array $A_i$ as indicated at 41. The amplitude array $A_i$ is related to the maximum mean amplitude and can later be used to grade the reflections.

The $T_i$ array and the $D_i$ array are used to obtain the output migrated seismic cross-section. The migrate instructions, indicated at 42, combine the velocity information, indicated at 43, with the $T_i$ and $D_i$ arrays. The migration step 42 determines actual vertical depth Z and horizontal displacement H in accordance with the equations for H and Z. The values of H and Z are used to print out the migrated seismic cross-section as indicated at 44.

In order to make a comparison between migrated seismic cross-sections which will show the presence of multiples, two other migrated seismic cross-sections are produced. In order to do this, the group of instructions indicated at 45 performs the multiple determination referred to previously. That is, all pairs in the $T_1$ and $D_i$ array are compared with pairs of all possible sums of the values in the $T_i$ and $D_i$ arrays. Correspondence between a pair of values in the $T_i$ and $D_i$ arrays and a pair of sums indicate a multiple reflection which is rejected. The values which remain in the $T_i$ and $D_i$ array are migrated with the set of instructions indicated at 46 and printed out in a migrated seismic cross-section without multiples as indicated at 47.

In order to produce an output cross-section showing only multiple reflections, the multiples are determined at 48. Only these multiple reflections are migrated at 49 to produce an output seismic cross-section showing only multiple reflections as at 50. With the three output migrated seismic cross-sections produced at 44, 47 and 50, it is possible to make a comparison which shows whether or not the field procedure which produced the seismograms was effective in suppressing multiples.

Figure 3:
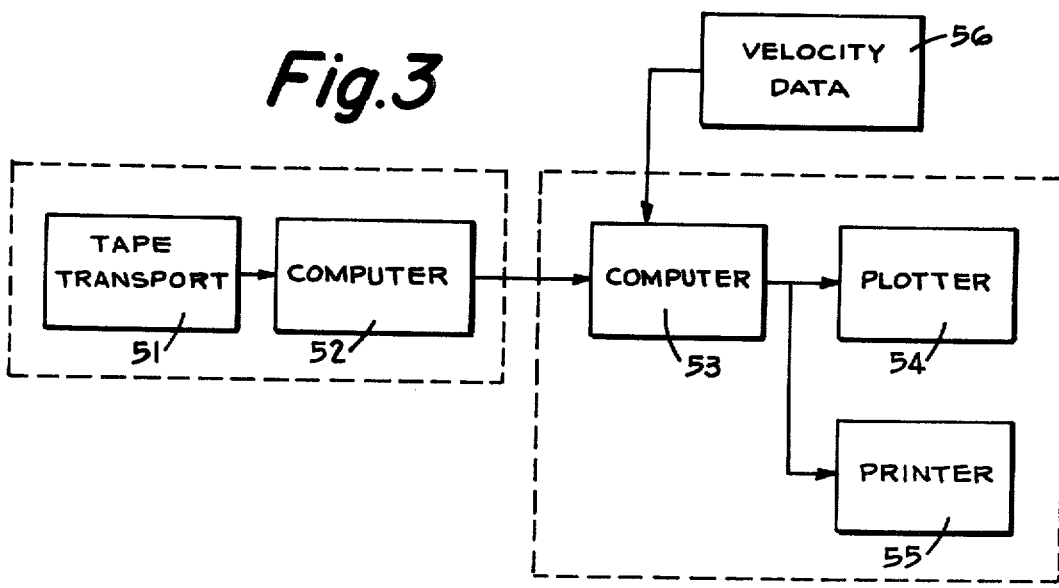
FIG. 3 shows a block diagram of a computer system suitable for carrying out the invention.

A block diagram of a computer system for carrying out the method of this invention is shown in FIG. 3. The seismic traces are recorded on magnetic tape in analog form. These magnetic tapes are played back in tape transport 51. An example of a tape transport suitable for this purpose is the 56-channel SIE magnetic tape recorder. The played-back seismic traces are digitized and corrected for normal moveout and static errors in the digital computer 52. For example, a Control Data Corporation 160 Computer is suitable for this purpose. The combination of tape transport 51 and digital computer 52 forms a hybrid analog-digital computing system such as that more fully described in the copending application of our co-worker Gerard D. Koeijmans, Ser. No. 425,668, filed Dec. 29, 1964.

The output of computer 52 is applied to the digital computer 53 which may, for example, be a Control Data Corporation 1604 Computer. Computer 53 performs the steps which are necessary to develop the $T_i$ and $D_i$ arrays. These arrays are migrated and plotted in a migrated seismic cross-section on the plotter 54. This plotter may, for example, be the California Computer Products Plotter, Model No. 563. The results may also be printed out on the printer 55 which is a standard digital printer suitable for use with the computer 53. Velocity data is supplied to the computer 53 by means of recorded velocity data indicated at 56. This velocity data may, for example, be obtained from acoustic velocity logs.

A complete routine for carrying out the method of this invention is given below. This routine is written in Fortran language which is suitable for use on almost any large general purpose digital computer. All of the instructions given below are standard Fortran statements. An explanation of Fortran statements is provided, for example, in *FORTRAN Autotester*, by Robert E. Smith, Ph.D., and Dora E. Johnson, John Wiley & Sons, Inc., New York, New York, October, 1964, and *Introduction to FORTRAN*, by S. C. Plumb, McGraw-Hill Book Company, New York, New York. Following the routine is a brief description relating groups of instructions to the steps of the method of this invention.

First, the input parameters defining information pertaining to the seismic spread are given below. These parameters will be readily understood by those skilled in seismic prospecting.

| Plotting Parameters: | |
|---|---|
| Card No. 1 | 8F10.1 |
| XMAX - | Maximum depth in feet for the positive x-axis |
| XPOS - | Length in inches for the positive x-axis |
| XNEG - | Length in inches for the negative x-axis |
| YMAX - | Maximum horizontal distance in feet for positive y-axis |
| YPOS - | Length in inches for the positive y-axis |
| YNEG - | Length in inches for the negative y-axis |
| XTCKS - | x-axis divisions in feet |
| YTCKS - | y-axis divisions in feet (½ of surface spread length) |
| Card No. 1-A | F10.1 |
| SPACE - | Total number of shotpoints |
| Velocity Data: | |
| Card No. 5 | 3I5 |
| NST - | Number of time points |
| NSZ - | Number of depth points |
| NNZ - | Number of velocity samples output ($\leq 2000$) |
| Card No. 6 set | 8F10.4 |
| T(I) - | One-way travel time array of length NST ($\leq 100$) |
| Card No. 7 set | 8F10.1 |
| Z(I) - | Depth array of length NSZ corresponding to array ($\leq 100$) |
| Card No. 8 | 3F10.1 |
| VZERO - | Velocity at zero depth |
| ZZERO - | Datum |
| DELZ - | Velocity sampling increment in feet |
| Spread Parameters: | One for each pair of spreads |
| Card No. 3 | 13I4, 18 |
| NTCT - | Number of traces in first spread |
| NTCT2 - | Number of traces in second spread |
| NFIRST - | Starting sample number of trace where processing is to begin |
| NNSP - | Number of samples in each block ($\leq 500$) |
| NCT - | Trace number of center trace on first spread |
| NCT2 - | Trace number of center trace on second spread |
| NBLOCKS - | Number of blocks (windows) to be processed |
| LRECNO - | Key to stop program (LRECNO = 1 stops program) |
| IDUM1 - | Set to zero |
| IDUM2 - | Set to zero |
| IDUM3 - | Set to zero |
| IDUM4 - | Set to zero |
| IDUM5 - | Set to zero |
| Searching Parameters: | One for each pair of spreads |
| Card No. 4 | 6F6.1, F6.4, 4F6.1 |
| GAMMA - | Sweep in milliseconds to increasing time for first spread |
| GAMMA2 - | Sweep in milliseconds to increasing time |

|  |  |
|---|---|
| | for second spread |
| BETA - | Sweep in milliseconds to decreasing time for first spread |
| BETA2 - | Sweep in milliseconds to decreasing time for second spread |
| SINT - | Sampling increment in milliseconds (usual DELT) |
| CRSN - | Coarseness parameter -<br>1 - for every sample<br>2 - for every other sample<br>3 - for every third sample<br>4 - for every fourth sample |
| ALPHA - | Threshold of acceptance as a reflection expressed as a factor of trace RMS Level (usually set to 1) |
| SPRD1 - | Length of first spread in feet |
| SPRD2 - | Length of second spread in feet |
| *CC - | Threshold for accepting an event as a reflection expressed as a factor of the center trace reflection amplitude (usually set to 0.5) |
| *CUT - | Multiple cut-off point (¼ of total time of interest) |
| Card No. 4-A | 8F10.4 |
| CUTI - | Starting time of multiple rejection in sec. |
| *CUT - | Multiple cut-off point (¼ of total time of interest) |
| *CC - | Threshold for accepting an event as a reflection (see above) |
| TT - | Tolerance for multiple occurrence (.100 sec) in sec. |
| DT - | Dip tolerance for multiple occurrence in ms. ± (10-5 ms) |

The Fortran instruction in the routine are as follows:

```
    READ 9,XMAX,XPOS,XNEG,SPACE,YMAX,YPOS,YNEG,XTCKS,YTCKS,SHIFT
  9 FORMAT(8F10.1)
    CALL AXES(XMAX,XPOS,XNEG,SPACE,YMAX,YPOS,YNEG,XTCKS,YTCKS)
    CALL VOFZ(VBARZ,NNZ,DELZ)
 20 READ (4)
  4 FORMAT(5H 2N)
    READ (4)
    SPDIST = SPDIST + SPRD2
 30 READ 31,NTCT,NTCT2,NFIRST,NNSP,NCT,NCT2,NBLOCKS,LRECNO,NSPRD,
       NTIME
    1S,JAZ,JJAZ,NNR
 31 FORMAT (13I4)
 35 READ 36,GAMMA,GAMMA2,BETA,BETA2,SINT,CRSN,ALPHA,SPRD1,SPRD2,
       CC,CUT
 36 FORMAT (6F6.1,F6.4,4F6.1)
    NTRIM = NFIRST + NBLOCKS*NNSP
    YYNEG = MAXIF(YPOS,YNEG)
 32 KAY = O
    NT = NTCT
130 PLUS = GAMMA/SINT
135 FMINUS = BETA/SINT
140 NPLUS = PLUS
145 MINUS = FMINUS
 77 NSTART = NFIRST
 78 NSTOP = NSTART + NNSP - 1
 50 CALL IDIN(4)
 51 PRINT 52
    LOOP = 1
 52 FORMAT (1H 4HIDIN)
 53 IF(IA(2))55,406,55
 55 NS = IDR(5)
 60 DO 105 N = 1,NTCT
 65 CALL TRIN (4,NS)
 63 IF(NTIMES) 70,64,70
 64 CALL RMSQ(NTRIM,NFIRST,RMS)
 66 TRIM(N) = 500./RMS
 70 K = NTCT - N + 1
 71 IF(NSPRD-1)75,72,72
 72 K = N
 75 DIST(N) = KTR(13)
 80 DO 85 J = NSTART,NSTOP
 81 JL = J-NSTART + 1
 85 A(K,JL) = S(J)*TRIM(N)
    IF(JAZ)90,90,105
125 CALL PEEKPIK(RMS,ALPHA,NBETA,2000,R,NR)
105 CONTINUE
110 IF(JAZ-1)115,160,160
115 CONTINUE
120 RMS = 500.
127 FORMAT (1H 18HREFLECTIONS PICKED)
    DO 123 I = 1,1000
    DIP(I) = 0.
123 FLECAMP = 0.
150 NINR = NSTOP - NPLUS
155 FLNINR = NINR
160 NBETA - NSTART + MINUS
    DO 170 I = NBETA,NINR
    JAY = I - NBETA + 1 + KAY
165 IF(R(JAY) - FLNINR)170,170,175
170 NNR = NNR + 1
175 CONTINUE
```

```
 180 IF(JAZ-1)181,186,186
 181 JAZ = 1
 185 MNR = 1
 186 IF(NNR-1)193,190,190
 190 CONTINUE
1020 DO 1200 L = MNR,NNR
1030 LL = R(L)
1035 LL = LL - NSTART + 1
1040 NNT = NT - 1
1041 TN = NNT
1045 DELTA = BETA + GAMMA
1050 SW = DELTA/(SINT*CRSN)
1055 NSW = SW
1070 DO1145 K = 1,NSW
1075 PK = K
1080 EPS = BETA/TN-PK*DELTA/(TN*SW)
1085 AMP = 0.0
1086 NL = LL
1090 DO1135 I = 1,NT
1095 AMP = AMP + A(I,NL)
1100 FLTI = I
1101 DELT = FLTI*EPS/SINT
1110 IDELT = DELT
1120 NL = LL - IDELT
1135 CONTINUE
1130 AMEAN = AMP/FLTI
1140 PHI(K) = AMEAN
1145 CONTINUE
1148 KKK = 1
1149 PKKK = KKK
1155 PMAX = ABSF(PHI(1))
1150 DO1185 KK = 1,NSW
1156 Q = PHI(KK)
1160 ABSPHI = ABSF(Q)
1165 IF(PMAX-ABSPHI)1170,1185,1185
1170 PMAX = ABSPHI
1175 KKK = KK
1180 PKKK ' KKK
1185 CONTINUE
     IF(KKK.GT.1.AND.KKK.LT.NSW)1190,1186
1186 PHI(KKK) = 0.0
1190 DIP(L) = BETA-PKKK*DELTA/SW
1195 FLECAMP(L) = PHI(KKK)
1200 CONTINUE
1595 IJ = 0
     KLIK = 1 $ SPDIST = SPDIST-SHIFT
1600 DO 1610 I = 1,NNR
     DO 1605 J = I,NNR
1601 IJ = IJ + 1
     PROD = SQRTF(FLECAMP(I)*FLECAMP(J))
     IF(PROD.GT.PRO)1602,1606
1602 IF(IJ.EQ.2000)1619,1604
1604 FOSM(IJ) = R(I) + R(J)
     DIPSM(IJ) = DIP(I) + DIP(J) $ ASM(IJ) = PROD
     IF(FOSM(IJ).GT.CUT)1606,1605
1606 IJ = IJ - 1
     GO TO 1610
1605 CONTINUE
1610 CONTINUE
1619 DO 1620 I = 1,IJ
     R(I) = FOSM(I) $ DIP(I) = DIPSM(I) $ FLECAMP(I) = ASM(I)
1620 CONTINUE
1220 DO 1300 I = 1,NNR
     K = R(I)
1230 CRIT = ABSF(CC*CNTR(K))
     IF(CRIT-500.)1231,1232,1232
1231 CRIT = 500.
1232 CONTINUE
     HIGH = ABSF(FLECAMP(I))-4000.
     IF(HIGH)1240,1300,1300
1240 DIFF = FLECAMP(I)-CRIT
1250 IF(DIFF)1300,1260,1260
1260 IJ = IJ + 1
1410 P(I) = DIP(I)*0.0005/SPRD
1420 CONTINUE
     DO 1450 L = 1,NEWNR
     SN = -P(L)*VEL(L)
     CN = SQRTF(1.-SN*SN)
     ZZ(1) = DEPTH(L) + SN*SPRD
     HH(1) = -SPDIST + HORZ(L) + SPRD*CN
     HH(2) = -SPDIST + HORZ(L)
     ZZ(2) = DEPTH(L)
```

```
            ZZZ(1) = ZZ(1)*XPOS/XMAX
            ZZZ(2) = ZZ(2)*XPOS/XMAX
            HHH(1) = HH(1)*ABSF(YYNEG/YMAX)
            HHH(2) = HH(2)*ABSF(YYNEG/YMAX)
            CALL PLOTTITL(JXPT(II),3,0,1ZZZ(1)-.065,HHH(1))
            CALL PLOT (ZZ,HH,2,-8)
            IF(FLECAMP(L).GT.PROO)1425,1450
      1425  DH = -CREMNT*SN
            DZ = -CREMNT*CN
            ZZ(1) = ZZ(1) + DZ
            ZZ(2) = ZZ(2) + DZ
            HH(1) = HH(1) + DH
            HH(2) = HH(2) + DH
            CALL PLOT (ZZ,HH,2,-8)
      1460  CONTINUE
            DO 1470 L = 1,NEWNR
            SN = -P(L)*VEL(L)
            CN = SQRTF(1.-SN*SN)
            HH(1) = -(SPDIST + HORZ(L))
            ZZ(1) = DEPTH(L)
            HH(2) = -(SPDIST + HORZ(L) + SPRD*CN)
            ZZ(2) = DEPTH(L) + SN*SPRD
            ZZZ(1) = ZZ(1)*XPOS/XMAX
            ZZZ(2) = ZZ(2)*XPOS/XMAX
            HHH(1) = HH(1)*ABSF(YYNEG/YMAX)
            HHH(2) = HH(2)*ABSF(YYNEG/YMAX)
            CALL PLOTTITL(JXPT(II),3,0,1ZZZ(1)-.065,HHH(1))
            CALL PLOT(ZZ,HH,2,-8)
            IF(FLECAMP(L).GT.PROO)1465,1470
      1465  DH = -CREMNT*SN
            DZ = CREMNT*CN
            ZZ(1) = ZZ(1) + DZ
            ZZ(2) = ZZ(2) + DZ
            HH(1) = HH(1) + DH
            HH(2) = HH(2) + DH
            CALL PLOT(ZZ,HH,2,-8)
```

The above instructions have been arbitrarily numbered for identification purposes only. First, the instructions, READ 9, 9 FORMAT and CALL AXES bring into the machine the parameters that control the plotter. The instruction CALL VOFZ brings in the velocity information. In this instance only one velocity is used throughout.

Similarly, the instructions 20 through 78 bring in more input parameters and set statements equal to certain of the input parameters.

The instructions from 50 through 85 roughly correspond to the group of instructions 38 in FIG. 1. In this group of instructions the input traces are set into an array A(I,J). The instruction 64 calls up a subroutine RMSQ which adjusts all traces to a common rms level. This subroutine is incorporated in the input section. This adjustment is made by computing $$\sqrt{\sum_i S_i S_i} = \text{rms}$$

and using rms as a scale constant which when compared with a desired number, rms' is used as a scale factor for the particular trace.

Proceeding to instruction 125, the subroutine PEEK-PIK locates the peaks and troughs having an amplitude greater than $\alpha$ times the rms value. This generates an R-array and R contains the sample numbers of each peak and trough that satisfy this criteria.

The instructions from 1020 through 1200 are a "DO" loop which searches adjacent traces along dip lines to find a dip for which the maximum mean amplitude occurs.

The output of the "DO" loop including instruction 1020 through 1200 is an array R(L) indicating the sample number for the occurrence time of the primary reflection on the key trace, an array DIP(L) indicating the dip in milliseconds for the search line producing a maximum sum, and an array FLECAMP(L) indicating the maximum mean amplitude.

The instructions from 1595 through 1620 are a routine which computes the first order surface multiples for each of the reflections stored in the dip and occurrence time arrays.

The set of instructions from 1220 through 1260 compares the mean amplitude $|A|$ to two criteria. First, the mean amplitude $|A|$ is compared with an rms level of 500. Secondly, the mean amplitude is compared with a level of CC times the center trace, or key trace, amplitude which is denoted CNTR(I). If the mean amplitude is not greater than these levels, it is rejected as being not indicative of a primary reflection.

The instruction 1410 calls up the migration subroutine HANDZ.

The instructions 1420 through 1425 plot the reflecting points with a horizontal displacement, HORZ, and an actual vertical depth, DEPTH, as previously computed. The instruction 1425 is an instruction which performs a grading operation on the reflections.

The instructions at 1460 perform the same plotting as previously discussed for another set of 12 traces.

This is the end of the main program. The output is a migrated seismic cross-section with all of the reflection points plotted. The subroutines utilized in the foregoing program can be derived in accordance with principles well known to those skilled in digital computer programming.

A routine for computing the multiple reflections and rejecting them from the primary array follows:

The following routine corresponds in all majors aspects with the routine previously given. The primary difference is that in the following routine the multiple reflections are computed and rejected. This is performed in the set of instructions from 2000 to 2500.

```
      READ 9,XMAX,XPOS,XNEG,SPACE,YMAX,YPOS,YNEG,XTCKS,YTCKS
   9  FORMAT (8F10.1)
      CALL AXES(XMAX,XPOS,XNEG,SPACE,YMAX,YPOS,YNEG,XTCKS,YTCKS)
      CALL VOFZ(VBARZ,NNZ,DELZ)
  20  READ (4)
      READ (4)
  25  CONTINUE
  29  CONTINUE
  30  READ 31,NTCT,NTCT2,NFIRST,NNSP,NCT,NCT2,NBLOCKS,LRECNO,NSPRD,
      NTIME
      1S,JAZ,JJAZ,NNR
  31  FORMAT (1314)
  35  READ 36,GAMMA,GAMMA2,BETA,BETA2,SINT,CRSN,ALPHA,SPRD1,SPRD2
  36  FORMAT (6F6.1,F6.4,2F6.1)
      READ 4000,CUT1,CUT,CC,TT,DT
 4000 FORMAT (8F10.4)
  32  KAY = 0
      NT = NTCT
 130  PLUS = GAMMA/SINT
 135  FMINUS = BETA/SINT
 140  NPLUS = PLUS
 145  MINUS = FMINUS
  77  NSTART = NFIRST
  78  NSTOP = NSTART + NNSP - 1
      IF(LUP)50,50,5000
  50  CALL IDIN(4)
      LUP = 1
  53  IF(IA(2))55,406,55
 5000 CONTINUE
      IRNO = IRNO + 1
  60  DO 105 N = 1,NTCT
  65  CALL TRIN (4,NS)
  63  IF(NTIMES)70,64,70
  64  CALL RMSQ(NS,NFIRST,RMS)
  66  TRIM(N) = 500./RMS
  70  K = NTCT - N + 1
  71  IF(NSPRD - 1)75,72,72
  72  K = N
  75  DIST(N) = KTR(13)
  80  DO 85 J = NSTART,NSTOP
  81  JL = J - NSTART + 1
  85  A(K,JL) = S(J)*TRIM(N)
      IF(JAZ)90,90,105
  90  IF(N - NCT)105,95,105
  95  DO 100 L = 1,NS
      S(L) = S(L)*TRIM(N)
 100  CNTR(L) = S(L)
 121  DO 122 I = 1,2000
 122  R(I) = 0.0
 124  NBETA = NSTART + MINUS
 125  CALL PEEKPIK(RMS,ALPHA,NBETA,2000,R,NR)
 105  CONTINUE
 110  IF(JAZ - 1)115,160,160
 115  CONTINUE
 120  RMS = 500.
      DO 123 I = 1,1000
      DIP(I) = 0
 123  FLECAMP = 0.
 150  NINR = NSTOP - NPLUS
 155  FLNINR = NINR
 160  DO 170 I = NSTART,NINR
 161  JAY = I - NSTART + 1 + KAY
 165  IF(R(JAY) - FLNINR)170,170,175
 170  NNR = NNR + 1
 175  CONTINUE
 176  PRINT 177,NNR,MNR
 177  FORMAT (1H 2I10)
 180  IF(JAZ - 1)181,186,186
 181  JAZ = 1
 185  MNR = 1
 186  IF(NNR - 1)193,190,190
 190  CONTINUE
1020  DO 1200 L = MNR,NNR
1030  LL = R(L)
1035  LL = LL - NSTART + 1
1040  NNT = NT - 1
1041  TN = NNT
1045  DELTA = BETA + GAMMA
1050  SW = DELTA/(SINT*CRSN)
```

-continued

```
1055 NSW = SW
1070 DO 1145 K = 1,NSW
1075 PK = K
1080 EPS = BETA/TN - PK*DELTA/(TN*SW)
1085 AMP = 0.0
1086 NL = LL
1090 DO 1135 I = 1,NT
1095 AMP = AMP + A(I,NL)
1100 FLTI = I
1101 DELT = FLTI*EPS/SINT
1110 IDELT = DELT
1120 NL = LL - IDELT
1135 CONTINUE
1130 AMEAN = AMP/FLTI
1140 PHI(K) = AMEAN
1145 CONTINUE
1148 KKK = 1
1149 PKKK = KKK
1155 PMAX = ABSF(PHI(1))
1150 DO 1185 KK = 1,NSW
1156 Q = PHI(KK)
1160 ABSPHI = ABSF(Q)
1165 IF (PMAX - ABSPHI)1170,1185,1185
1170 PMAX = ABSPHI
1175 KKK = KK
1180 PKKK = KKK
1185 CONTINUE
     IF(KKK . GT . 1 . AND . KKK . LT . NSW)1190,1186
1186 PHI(KKK) = 0.0
1190 DIP(L) = BETA - PKKK*DELTA/SW
1195 FLECAMP(L) = PHI(KKK)
1200 CONTINUE
1220 DO 1300 I = 1,NNR
     K = R(I)
1230 CRIT = ABSF(CC*CNTR(K))
     IF(CRIT - 500.)1231,1232,1232
1231 CRIT = 500.
1232 CONTINUE
     HIGH = ABSF(FLECAMP(I)) - 4000.
     IF(HIGH)1240,1300,1300
1240 DIFF = ABSF(FLECAMP(I)) - CRIT
1250 IF(DIFF)1300,1260,1260
1260 IJ = IJ + 1
1270 R(IJ) = R(I)*0.002
1280 FLECAMP(IJ) = FLECAMP(I)
1290 DIP(IJ) = DIP(I)
     IF(R(IJ) - CUT1)1300,1294,1294
1294 IF(R(IJ) - CUT)1295,1295,1300
1295 NRM = NRM + 1
     DM(NRM) = 2. *DIP(IJ)
     RM(NRM) = 2. *R(IJ)
1300 CONTINUE
1305 CONTINUE
1310 NEWNR = IJ
1311 IF(IRNO - 2)2000,2040,2069
2000 DO 2030 I = 1,NEWNR
     IF(I - NRM)2020,2020,2025
2020 RM1(I) = RM(I) $ DM1(I) = DM(I)
2025 R1(I) = R(I) $ AMP1(I) = FLECAMP(I)
2030 D1(I) = DIP(I)
     N1 = NEWNR $ NRM1 = NRM
     GO TO 1500
2040 DO 2065 I = 1,NEWNR
     IF(I - NRM)2050,2050,2060
2050 RM2(I) = RM(I) $ DM2(I) = DM(I)
2060 R2(I) = R(I) $ AMP2(I) = FLECAMP(I)
2065 D2(I) = DIP(I)
     N2 = NEWNR $ NRM2 = NRM
     GO TO 2140
2069 IF(IRNO - 3)2100,2100,2070
2070 DO 2080 I = 1,NRM2
     RM1(I) = RM2(I) $ DM1(I) = DM2(I)
2080 CONTINUE
     NRM1 = NRM2
     DO 2085 I = 1,N2
     R1(I) = R2(I)$ D1(I) = D2(I)$ AMP1(I) = AMP2(I)
2085 CONTINUE
     N1 = N2
     DO 2090 I = 1,NRM3
     RM2(I) = RM3(I) $ DM2(I) = DM3(I)
2090 CONTINUE
     NRM2 = NRM3
```

```
         -continued
         DO 2095 I = 1,N3
         R2(I) = R3(I)$ D2(I) = D3(I)$ AMP2(I) = AMP3(I)
 2095    CONTINUE
         N2 = N3
 2100    DO 2120 I = 1,NEWNR
         IF (I − NRM)2110,2110,2115
 2110    RM3(I) = RM(I) $ DM3(I) = DM(I)
 2115    CONTINUE
         R3(I) = R(I) $ AMP3(I) = FLECAMP(I) $ D3(I) = DIP(I)
 2120    CONTINUE
         N3 = NEWNR $ NRM3 = NRM
 2140    LOO = 2*LRECNO
         IF(LOO − IRNO)2160,2150,2160
 2150    KAP = 1
 2160    IF(IRNO − 2)1500,2170,2270
 2170    DO 2220 J = 1,N1
         DO 2190 I = 1,NRM1
         A = ABSF(RM1(I) − R1(J))$ B = ABSF(DM1(I) − D1(J))
         IF(A . LT . TT . AND . B . LT . DT)2180,2190
 2180    AMP1(J) = 0.0
 2190    CONTINUE
         DO 2210 I = 1,NRM2
         A = ABSF(RM2(I) − R1(J)) $ B = ABSF(DM2(I) + D1(J))
         IF(A . LT . TT . AND . B . LT . DT)2200,2210
 2200    AMP1(J) = 0.0
 2210    CONTINUE
 2220    CONTINUE
         JJ = 0
         DO 2250 I = 1,N1
         IF(AMP1(I) . EQ . O . )2250,2240
 2240    JJ = JJ + 1
         R(JJ) = R1(I) $ FLECAMP(JJ) = AMP1(I) $ DIP(JJ) = D1(I)
 2250    CONTINUE
         NEWNR = JJ
         GO TO 334
 2270    DO 2350 J = 1,N2
         DO 2300 I = 1,NRM1
         A = ABSF(RM1(I) − R2(J)) $ B = ABSF(DM1(I) + D2(J))
         IF(A . LT . TT . AND . B . LT . DT)2280,2300
 2280    AMP2(J) = 0.
 2300    CONTINUE
         DO 2320 I = 1,NRM2
         A = ABSF(RM2(I) − R2(J)) $ B = ABSF(DM2(I) − D2(J))
         IF(A . LT . TT . AND . B . LT . DT)2310,2320
 2310    AMP2(J) = 0.0
 2320    CONTINUE
         DO 2340 I = 1,NRM3
         A = ABSF(RM3(I) − R2(J)) $ B = ABSF(DM3(I) + D2(J))
         IF(A . LT . TT . AND . B . LT . DT)2330,2340
 2330    AMP2(J) = 0.
 2340    CONTINUE
 2350    CONTINUE
         JJ = 0
         DO 2370 I = 1,N2
         IF(AMP2(I) . EQ . O . )2370,2360
 2360    JJ = JJ + 1
         R(JJ) = R2(I) $ FLECAMP(JJ) = AMP2(I) $ DIP(JJ) = D2(I)
 2370    CONTINUE
         NEWNR = JJ
         GO TO 334
 2380    DO 2450 J = 1,N3
         DO 2400 I = 1,NRM2
         A = ABSF(RM2(I) − R3(J)) $ B = ABSF(DM2(I) + D3(J))
         IF(A . LT . TT . AND . B . LT . DT)2390,2400
 2390    AMP3(J) = 0.
 2400    CONTINUE
         DO 2420 I = 1,NRM3
         A = ABSF(RM3(I) − R3(J)) $ B = ABSF(DM3(I) − D3(J))
         IF(A . LT . TT . AND . B . LT . DT)2410,2420
 2410    AMP3(J) = 0.
 2420    CONTINUE
 2450    CONTINUE
         SPRD1 = SPRD2
         JJ = 0 $ KAP = 0 $ MU = MU − 2 $ LST = 1 $ NSPRD = 0
         DO 2500 I = 1,N3
         IF(AMP3(I) . EQ . O . )2500,2460
 2460    JJ = JJ + 1
         R(JJ) = R3(I) $ FLECAMP(JJ) = AMP3(I) $ DIP(JJ) = D3(I)
 2500    CONTINUE
         NEWNR = JJ
  334    CALL OUTPUT(R,DIP,FLECAMP,NEWNR)
         IF(IRNO . EQ . 4)2351,2353
```

-continued

```
2353    IF(IRNO - MU)2352,2351,2352
2351    SPDIST = SPDIST + SPRD1
2352    CONTINUE
        SPRD = SPRD1
1400    DO 1410 I = 1,NEWNR
1410    P(I) = DIP(I)*.001/SPRD
1411    CALL HANDZ(VBARZ,P,R,DELZ,VEL,HORZ,DEPTH,NEWNR,NNZ)
        IF(NSPRD - 1)1460,1420,1420
1420    SPRD = SPRD½.
        II = II + 1
        DO 1450 L = 1,NEWNR
        SN = -P(L)*VEL(L)
        CN = SQRTF(1. - SN*SN)
        ZZ(1) = DEPTH(L) + SN*SPRD
        HH(1) = -SPDIST + HORZ(L) + SPRD*CN
        HH(2) = -SPDIST + HORZ(L)
        ZZ(2) = DEPTH(L)
        ZZZ(1) = ZZ(1)*XPOS/XMAX
        ZZZ(2) = ZZ(2)*XPOS/XMAX
        HHH(1) = -HH(1)*YNEG/YMAX
        HHH(2) = -HH(2)*YNEG/YMAX
        CALL PLOTTITL(JXPT(II),3,0,1,ZZZ(1) - .065,HHH(1))
        CALL PLOT(ZZ,HH,2,-8)
1450    CONTINUE
        IF(KAP - 1)1500,2380,1500
1455    GO TO 1500
1460    SPRD = SPRD½.
        II = II + 1
        DO 1470 L = 1,NEWNR
        SN = -P(L)*VEL(L)
        CN = SQRTF(1. - SN*SN)
        HH(1) = -(SPDIST + HORZ(L))
        ZZ(1) = DEPTH(L)
        HH(2) = -(SPDIST + HORZ(L) + SPRD*CN)
        ZZ(2) = DEPTH(L) + SN*SPRD
        ZZZ(1) = ZZ(1)*XPOS/XMAX
        ZZZ(2) = ZZ(2)*XPOS/XMAX
        HHH(1) = -HH(1)*YNEG/YMAX
        HHH(2) = -HH(2)*YNEG/YMAX
        CALL PLOTTITL(JXPT(II),3,0,1,ZZZ(1) - .065,HHH(1))
        CALL PLOT(ZZ,HH,2,-8)
1470    CONTINUE
1500    CONTINUE
```

The foregoing program is similar in all essential aspects to the program previously described except that there is provision for computing multiples. Briefly, the relationship between the instructions in the foregoing program and the flow sheet of FIG. 1 is as follows.

The instructions from 9 through 32 correspond with the insertion of input parameters into the computer as denoted at 37 in FIG. 1. The instructions from 30 through 100 select the key trace and adjust all traces to the same rms level as indicated at 38 in FIG. 1. The instruction 125 calls up subroutine PEEKPIX which finds the occurrence times of reflections on the key trace which exceed in amplitude α times a given rms level. This is as indicated at 39 in FIG. 1.

The instructions 1020 through 1290 perform the lateral search for corresponding reflections on adjacent traces as indicated at 40 in FIG. 1. The result of this operation is a series of occurence times stored in the T-array, a series of search line attitudes stored in the D-array and a series of amplitude levels stored in the A-array.

Instructions 1294 through 1311 compute the multiples as indicated at 48 in FIG. 1. The instructions 2000 through 2500 search the T- and D-arrays for the multiple reflections and reject those indicated as being multiples. This is as indicated at 45 in FIG. 1. Instruction 1411 calls up the subroutine HANDZ which migrates the primaries into a form suitable for plotting. This is as indicated at 42, 46 and 49 in FIG. 1. Finally, the instructions at the end of the above routine plot the migrated reflections in a seismic cross-section as indicated at 44 in FIG. 1.

As a variation of the technique previously described, it is possible to convert manually interpreted seismic time sections into interpreted seismic depth sections by the techniques shown in block form in FIG. 4. The steps shown in block form in FIG. 4 may be performed instead of the steps 37-40 in the method of FIG. 1.

Figure 4A:
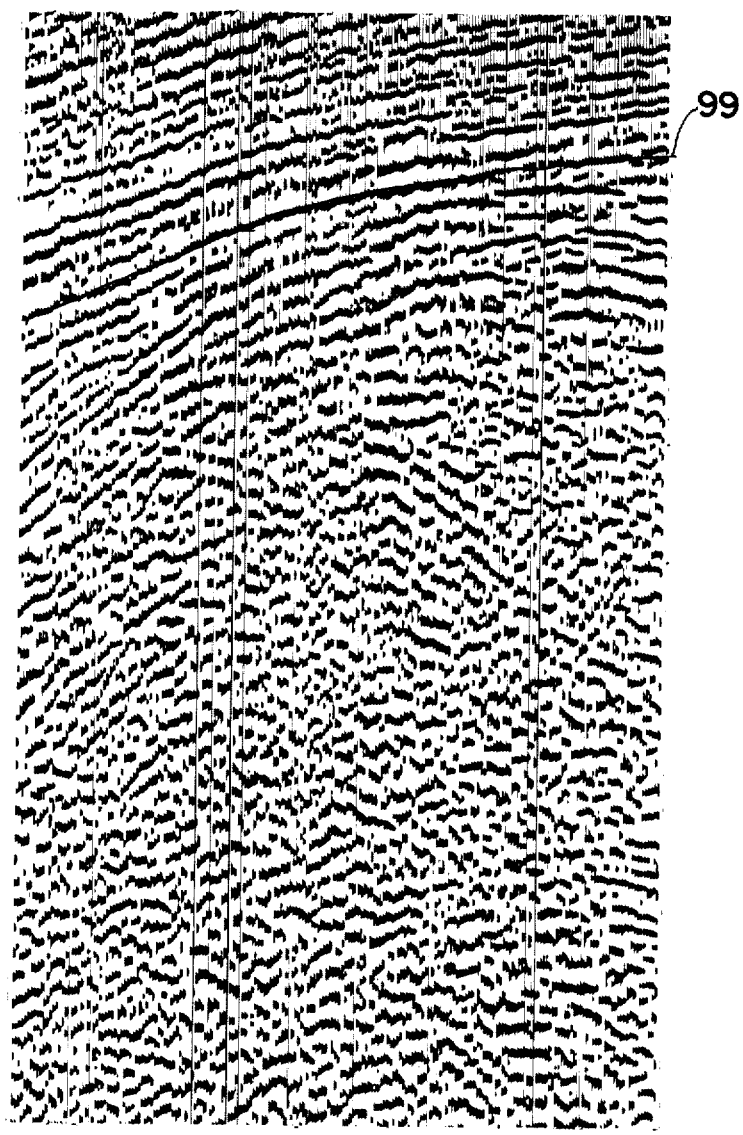
FIG. 4a shows a seismic time section.

In carrying out this embodiment of the invention, seismic time sections, such as the one shown in FIG. 4, are marked to form lines of continuity which represent reflections from subsurface interfaces. FIG. 4a is an example of a seismic time produced from actual field data. (Processed to remove noise.) The cross-section is produced from traces from a large number of geophones spaced along a line of exploration. In this type of cross-section the time increases linearly from top to bottom. Extending horizontally across the seismic cross-section are 210 traces. Each trace is from a separate geophone. Each of the traces is of the variable area type. That is, each trace has marks having an area proportional to the magnitude of the reflection being plotted. As shown in FIG. 4a, reflecting interfaces sloping downwardly toward the left can be detected. One such reflecting interface is marked and indicated at 99 in FIG. 4a. It is the practice of seismic interpreters to mark all of the discernible subsurface interfaces on a seismic cross-section withlines of continuity such as the line 99.

For simplicity in description, an idealized marked seismic cross-section has been shown in FIG. 4b. FIG.

4b shows the line of continuity 100 which has been drawn across the seismic time section at reflection points. Similarly, the lines of continuity 101, 102, 103 and 104 have been drawn to adjacent reflections on the seismic time section. It is necessary to distinguish these lines of continuity one from the other. This distinction may be made by using different colors for the different lines of continuity.

A curve follower is used to convert these lines of continuity into distance-time data. A curve follower of the photoelectric type will automatically follow the line of continuity 100, for example, and will periodically produce outputs of values of T for corresponding values of X. For example, a curve follower such as the commercially available Calcomp 417 may be used to convert each of the lines of continuity 100–104 into distance, time (X,T) information.

The step of converting the interpreted seismic time section into distance-time data by means of the curve follower is indicated at 105 in FIG. 4, the curve follower itself being indicated at 51a in FIG. 3a, a modification of FIG. 3. The distance-time data are used to compute values of $\Delta T/\Delta X$ for various values of T and X as indicated at 106 in FIG. 4. The conversion step indicated at 106 is a straight-forward step. Since the curve follower search 105 periodically provides a value of T and a value of X, the increments $\Delta T$ and $\Delta X$ between the periodic values can be determined by subtracting consecutive values one from the other. Having determined $\Delta T$ and $\Delta X$ for each time T, the ratio $\Delta T/\Delta X$ for each time T can be obtained.

The values of $\Delta T/\Delta X$ for each value of T, together with the average velocity of the earth at the surface, are used to calculate the dip $\theta_i$ of the subsurface reflecting interfaces as indicated at 107 in FIG. 4. The average velocity characteristic of the earth at the surface, hereinafter denoted $V_O$, can be determined from numerous well-known techniques. The manner in which the step 107 is performed can best be understood with reference to FIG. 5. As shown in FIG. 5, the geophones 108 and 109 detect seismic energy which travels from a shot at the surface to the dipping reflecting interface 110 and thence to geophones 108 and 109. For the purpose of this explanation, consider the wave front of the seismic energy reflected from the interface 110. The wave front immediately adjacent the reflecting interface 110 is depicted at 111. A portion of the wave front as it approaches the earth's surface is depicted at 112. Note that the wave front will arrive at geophone 109 at a time later than its arrival at geophone 108. The dip of the reflecting interface 110, the dip being designated $\theta_i$ determines the amount of the time delay.

The time delay $\Delta T$ between the arrival of the seismic energy at geophones 108 and 109 can be used to determine this dip $\theta_i$. Note that when the wave front 112 is at the position shown, the normal distance between the wave front 112 and the geophone 109 is $\Delta TV_0$, where $V_0$ is the surface velocity characteristic of the earth. From the triangle shown in FIG. 5, it is seen that $\theta_i$ is given by:

$$\sin \theta_i = \Delta T V_0 / \Delta X$$

where $\theta_i$ is a particular value of the dip angle $\theta$ as shown in FIG. 5.

Therefore, $\theta_i$ can be determined from values of $V_0$ and $\Delta T/\Delta X$ in accordance with the foregoing. This step is performed as indicated at 107 in FIG. 4.

The outputs from step 107 are values of dip $\theta_i$, which values are denoted $D_i$, for corresponding values of time T, which values are denoted $T_i$. These values of $D_i$ and $T_i$ are migrated to find actual depth and horizontal displacement. This migration is indicated at 113 in FIG. 4. and is the same step as is performed at 42 in FIG. 1. Briefly, migration consists of determining actual depth Z by generating computed time in accordance with the equation previously given an incrementing this value of computed time until correspondence is reached between time and the occurrence time from the seismogram. The horizontal displacement is similarly determined from the equation for H previously given. The values of dip, $D_i$, actual depth Z and horizontal displacement H are used to plot a migrated cross-section as indicated at 114 in FIG. 4 and as has been previously described in conjunction with the step 44 in FIG. 1. There is thus produced a migrated cross-section of the type shown in FIG. 2e which has been previously described.

As an alternative to the curve follower search performed as indicated at 105 in FIG. 4, it is possible to generate the distance and time functions by means of a light pen or similar device. In accordance with this technique, the seismic time section map is displayed on an oscilloscopic type scope. The reflecting interfaces are traced with a light pen of the commercially available type which automatically converts the tracings into reflection times as a function of distance across the time section. These functions are stored. The values are converted to $\Delta T/\Delta X$ as indicated at 106 and the remainder of the process is the same as that described in conjunction with FIG. 4.

Certain other of the steps of the present invention can be implemented by these techniques which are commonly referred to as computer graphics. These techniques utilize a cathode ray oscilloscope for displaying the data or plot under consideration and an input device, such as a light pencil, for use by the operator in directly inserting information within its knowledge directly into the machine. For example, a skilled geophysicist can readily identify continuous reflections on a displayed migrated depth section and can insert into the computer information indicating this continuity. As another example, a skilled geophysicist may identify a pinchout and, by using the light pencil, identify this on the plot. Two commercially available systems suitable for such use are the Control Data Corporation digi-graphic system 270 and the IBM 2250 system.

Figure 6:
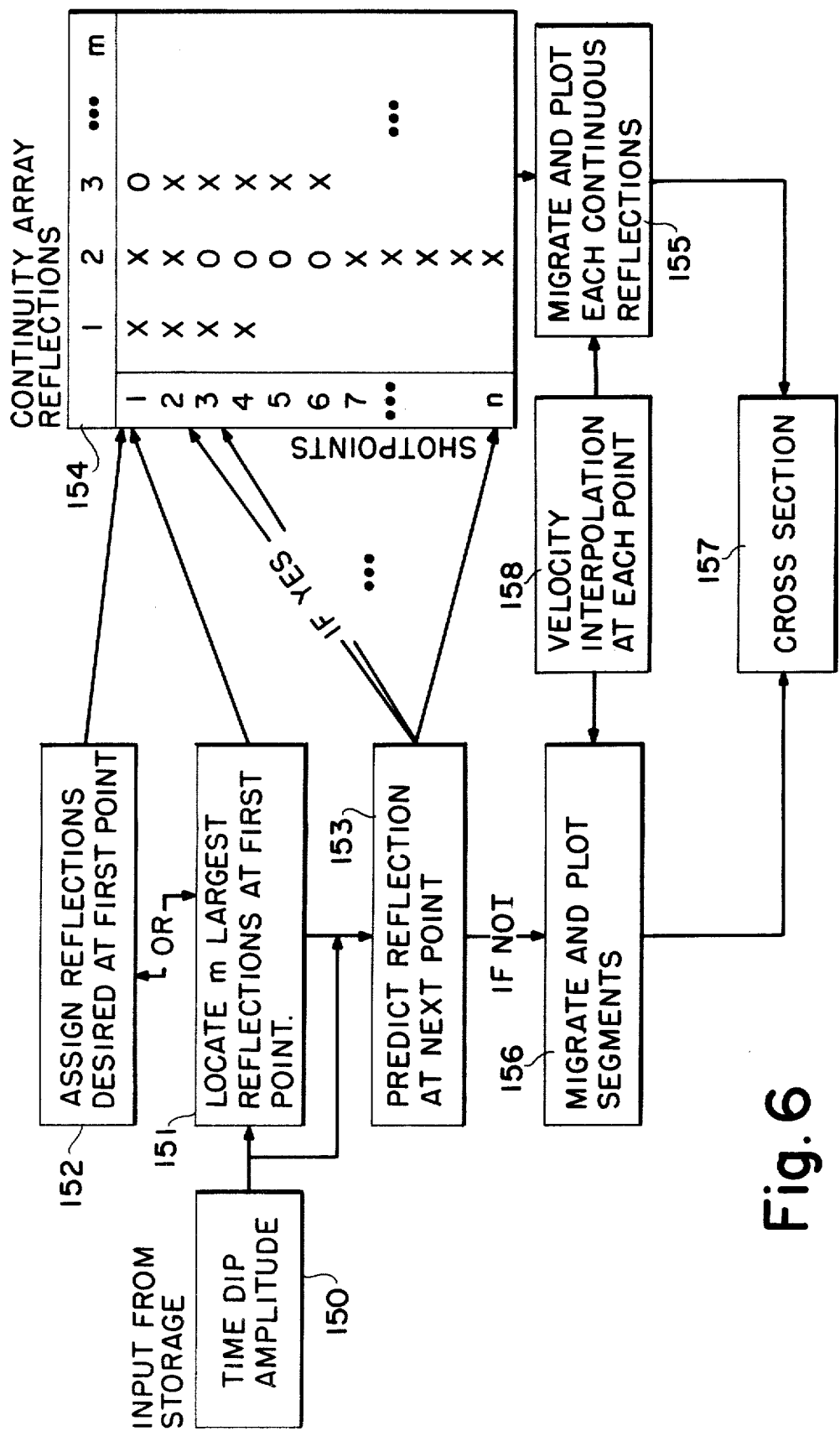
FIG. 6 shows a block diagram of another modification of the invention.

A feature of the output presentation of FIG. 2e that is sometimes undesirable is that the reflections are depicted by a series of line segments which lack continuity. The interpreter must visually integrate the segments laterally to provide the continuity of reflections which outline the earth's layering. A modification of the process which will automatically provide continuity between plotted segments which are indicative of the same reflecting interface is shown in FIG. 6. In FIG. 6 the inputs from storage are time, dip and amplitude of a reflecting interface as indicated at 150. These values of time, dip and amplitude have been previously denoted $T_i'$, $D_i$ and $A_i$ and may be obtained by the process depicted in FIG. 1 which produces these three outputs at 41. In accordance with this modification these reflections, identified by values of $T_i$, $D_i$ and $A_i$, are located at each shot point as in the process previously described. Then, reflections are predicted from shot point to shot point. Those reflections which are predictable are sorted into a continuity array.

Referring back to FIG. 6, the process may be initiated in one of two ways. The process may be started automatically by locating the largest reflections on the various on the various traces produced by seismic energy from a particular shot point. The process of locating the largest reflections at a particular point is indicated at 151. Alternatively, the interpreter may assign the initial values of the reflections of the first shot point to the continuity array so that the process will follow desired reflections, provided the reflections satisfy the criteria set by the searching process. The alternative of having the interpreter assign the initial reflections to the continuity array is indicated at 152. By following this procedure there will be plotted a reflection that the interpreter has selected as representative of a particular geological horizon.

From the values of time, dip and amplitude for a reflection from a particular shot point a prediction can be made as to the time and dip of a reflection from the same interface produced by seismic energy from the next succeeding shot point. The predicted value is compared with the reflections from the next succeedng shot point to determine whether there is correspondence. This step is indicated at 153 and will subsequently be described in more detail in conjunction with FIG. 6a. If the comparison indicates that there is continuity the reflections are sorted into a continuity array as indicated at 154.

After the complete input section has been searched and the continuity array has been filled, each continuous reflection is read out of the continuity array, migrated, and plotted as a continuous line, this step being indicated at 155. The migration and plotting are in accordance with principles already described except that in this case the reflections are plotted as continuous lines rather than disconnected line segments.

The reflections which are not predictable and thus not sorted into the continuity array, may carry desirable information concerning the earth's layering such as faulting, pinchouts, or lensing. The reflections which are not predictable are migrated and plotted as indicated at 156 and as carried out in accordance with the techniques previously described for migration and plotting.

From the plot of the continuous reflections produced from 155 and from the plot of the non-continuous reflections produced from 156, there is plotted a final seismic cross-section at 157.

In accordance with another aspect of the invention velocity information may be introduced at any point on the section. This is indicated at 158 wherein velocity information is introduced into the migrations carried out at 155 and 156. The velocity at intermediate shot points may then be interpolated between the shot points for which the velocity is introduced. In this case migration occurs with a continuous lateral change in velocity.

Figure 6A:
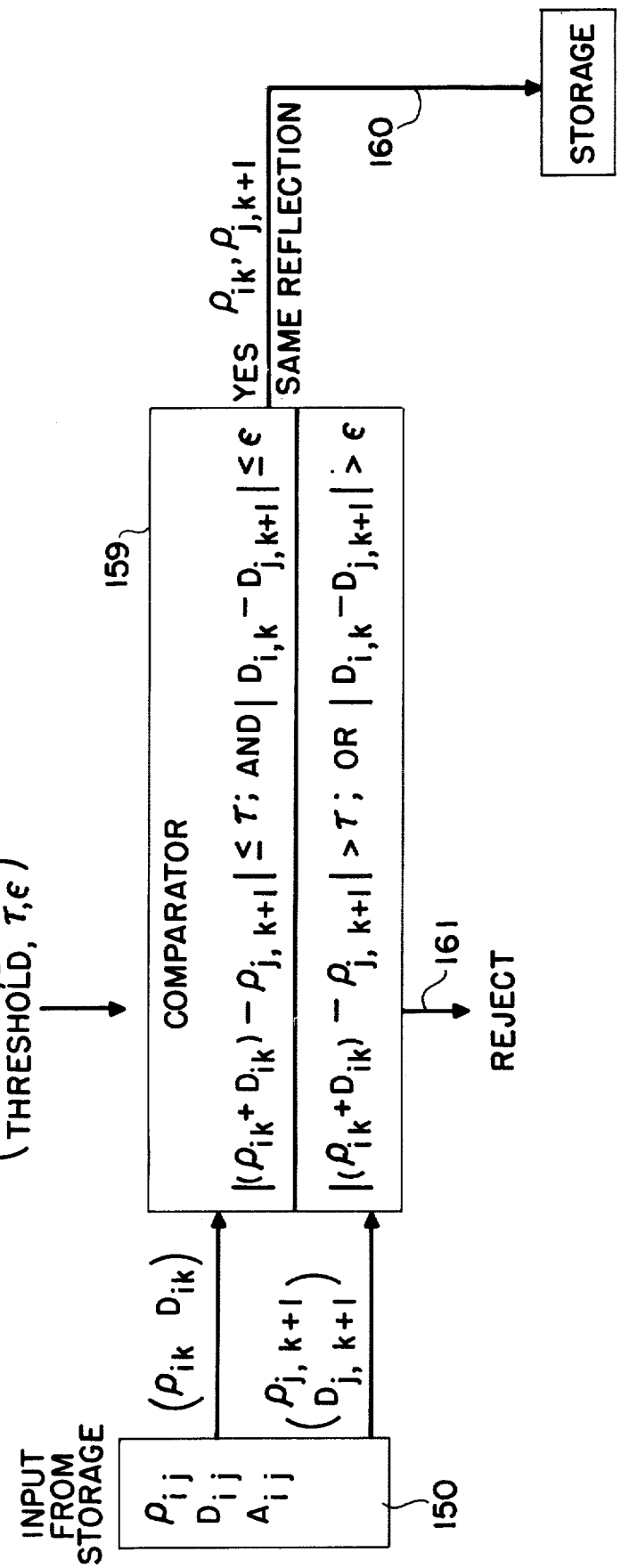
FIG. 6a depicts the prediction step of FIG. 6.

The manner in which a prediction is made of the time and dip of the reflection produced by energy from the next succeeding shot point can be better understood with reference to FIG. 6a which shows the step 153, FIG. 6, in more detail. The values of time, dip and amplitude are obtained from storage as indicated at 150. The values of time, dip and amplitude are denoted $\rho_{ij}$, $D_{ij}$ and $A_{ij}$.

In the foregoing the first subscript denotes the index of the reflection and the second subscript denotes the index of the shot point. For example, the value $\rho_{ij}$ might represent the ninth reflection obtained from the tenth shot point. Stated another way, $\rho_{ij}$ represents the $i^{th}$ reflection time of energy from the shot point at the $j^{th}$ location. The indices for amplitude are the same.

A prediction can be made of the reflection time at the next succeeding shot point by adding the indicate dip between the two shot points to the value of occurrence time. For example, one input from storage is indicated to be $(\rho_{ik}+D_{ik})$. This indicates that the dip, $D_{ik}$, for the $i^{th}$ reflection time obtained from the shot point location k is added to the occurrence time $\rho_{ik}$ for the $i^{th}$ reflection time obtained from the shot point location k. The sum is a prediction of the occurrence time for the same reflection obtained from the next succeeding shot point, i.e., from shot point location k+1. This sum is applied to a comparator as indicated at 159. Another input to the comparison step is the stored value of occurrence time $p_{j}$,k+1 from the next succeeding shot point location k+1. The stored value of occurrence time is compared with the predicted value of taking the difference between them. If the difference is less than or equal to a threshold level, denoted $\tau$, there is a determination that the two reflecting times are in fact from the same subsurface interface, i.e., there is continuity.

Similarly a comparison is made between the stored values of dip obtained for the same reflection from two adjacent shot points. The value of dip for the $j^{th}$ reflection obtained from shot point k+1 is subtracted from the stored value of dip for the same reflection from shot point k. If the difference between these two values is less than or equal to the threshold level denoted $\epsilon$ there is again an indication that the reflections are from the same subsurface interface, i.e., there is continuity. Only if both of these tests are met will there be produced an output at 160 indicating continuity.

The reflections having indicated continuity produced at the output 160 (FIG. 6a) are placed into the continuity array as indicated at 154 in FIG. 6. Of course, the reflections for which the comparison step indicates a difference greater than the thresholds $\tau$ or $\epsilon$ are rejected from the continuity array as indicated at 161, (FIG. 6a). These reflections may, however, be migrated and plotted as indicated at 156 in FIG. 6.

The stored values indicating continuous reflecting interfaces in an array can be better understood with reference to the array given below by way of illustration.

| Shot Points | REFLECTIONS | | | | | | |
|---|---|---|---|---|---|---|---|
| | 1 | 2 | 3 | 4 | 5 | ... | m |
| 1 | 100 X | 238 X | | | X | | |
| 2 | 105 X | 240 X | | | X | | |
| 3 | 110 X | 250 X | | | X | | |
| 4 | 112 X | 240 X | | | X | | |
| | | W | | | | | |
| 5 | 0 | 235 X | | | X | | |
| 6 | 0 | 230 X | | | X | | |
| 7 | 0 | 230 X | | | X | | |
| 8 | 0 | 225 X | | | X | | |
| 9 | 0 | 220 X | | | X | | |
| 10 | 0 | 220 X | | | X | | |
| n | | | | | | | |

Each column in the array indicates a particular reflection. That is, the first column, which includes four x's, indicates that the same reflecting interface has been indicated by reflections on the seismograms obtained from the first four shot points. That is, for example, a reflection occurring 100 milliseconds after shot time has been detected on the seismogram from the first shot point; a reflection occurring at 105 milliseconds after shot time has been detected on the seismogram obtained from shot point 2; a reflection occurring at 110 milliseconds after shot time has been detected on the seismogram obtained from shot point 3 and a reflection occurring at 112 milliseconds after shot time has been detected on the seismogram obtained from shot point 4. These occurrence times are each compared with the predicted value of occurrence time as described with regard to the step 153 in FIG. 6. Assume that each of the occurrence times differs from the predicted occurrence times by a value less than a threshold level. Then continuity is indicated by placing an information bit at the appropriate place in the stored array. Continuity is indicated in the above table by x's. Further, assume that the first reflection detected on the seismogram from the fifth shot point occurs at 235 milliseconds after shot time. A comparison of the predicted value with this reflection time will produce a difference greater than the threshold level $\tau$. Therefore, an entry representing a lack of continuity is inserted into the continuity array at this point, lack of continuity being indicated by a "0" in the above table.

Now consider the second reflection detected on the seismogram from the first shot point. The second reflection is detected at 238 milliseconds after shot time. On the seismogram from the second shot point a reflection is detected at 240 milliseconds. On succeeding shot points there have been reflections detected at 250, 240, 235, 230, 230, 225, 220 and 220 milliseconds. Each of these reflections meets the test of continuity and therefore an entry representing continuity is stored in this entire column of the continuity array.

As another aspect of the present invention, the information as to continuous reflecting points stored in the continuity array can be combined with known geologic data about the area under investigation. For example, the interpreter may know of the existence of a well top at a particular location. A well top is the depth to a given, known, reflecting interface. The interpreter may know of the existence of such a reflecting interface at a particular depth because of velocity logging data or information obtained from other geophysical surveys. The depth to the known well top may be converted to seismic energy travel time and an indication inserted at the array at the appropriate place. For example, the interpreter may know of the existence of a well top at a depth corresponding with a time of 240 milliseconds under the location of shot point 4. The interpreter will insert into the continuity array an entry indicating the presence of the well top at this point. This is indicated in the above array by a W in the column for the second reflection time and in the horizontal row for the fourth shot point. When the information contained in the continuity array is plotted out, an indication of a known well top may easily be printed on the plot at the appropriate place. This is an invaluable aid to the interpreter in assuring him that the plotted continuous reflection represents a particular known reflecting interface. Similarly, correlation points and other known geologic features may be indicated on the final plot by converting them to occurrence times and inserting them into the proper location in the continuity array.

Figure 6B:
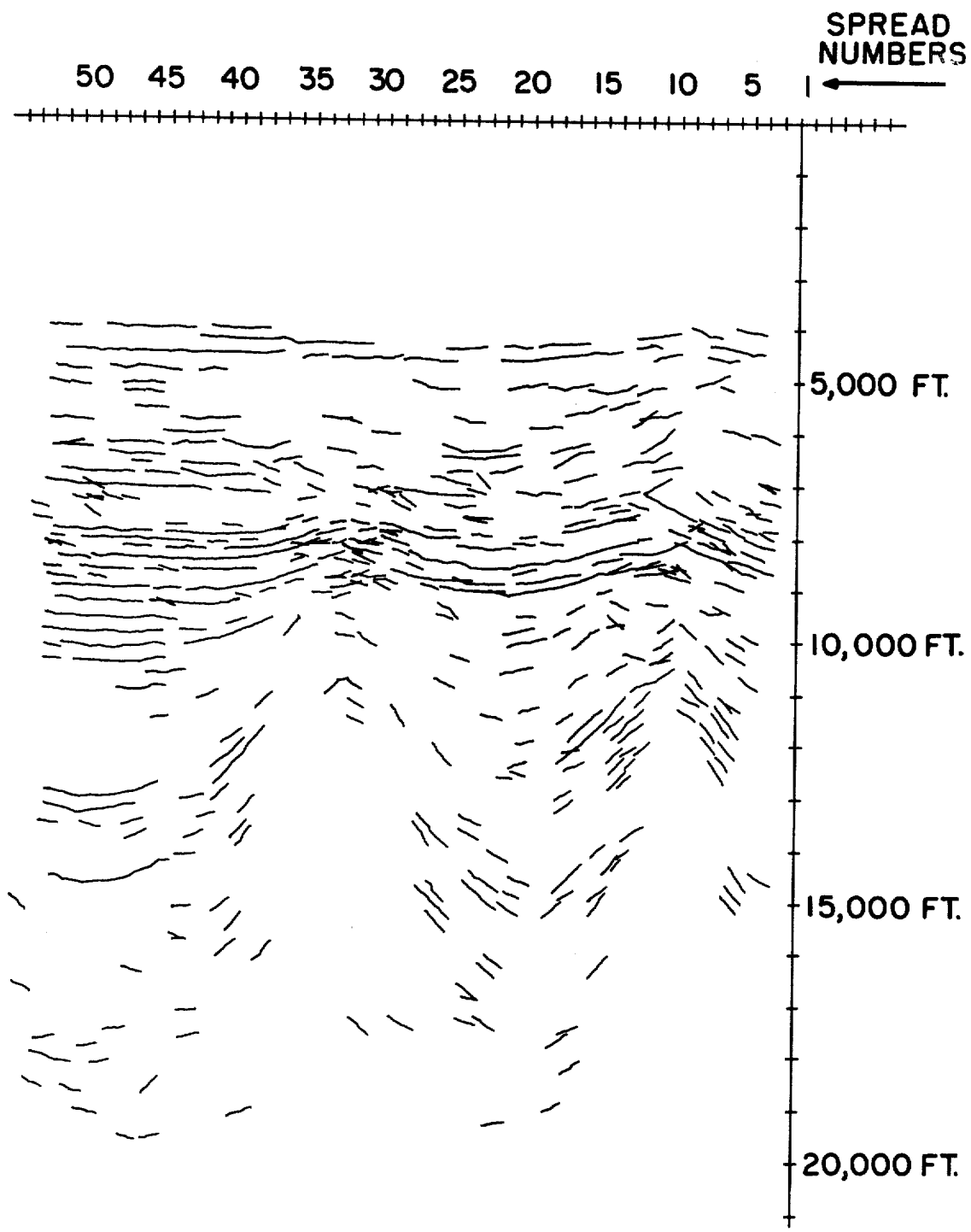
FIG. 6b shows a depth section produced in accordance with the modification of FIG. 6.

Referring to FIG. 6b there is shown a migrated depth section produced in accordance with the modification of FIG. 6. In FIG. 6b all reflections for which no continuity has been indicated have been plotted only below 1.5 seconds, which corresponds with 7000 feet on the depth section. Note particularly the continuous reflecting interfaces which have been plotted in the area around 8000 feet.

In FIG. 6b there are few plotted reflections below 10,000 feet but this is due to the difference in energy levels of reflections received after about 2.0 seconds after shot time. It is possible to apply programmed gain and spreading corrections to the deeper reflections and if this is done the number of reflections plotted at the deeper depths would be materially increased.

Figure 7:
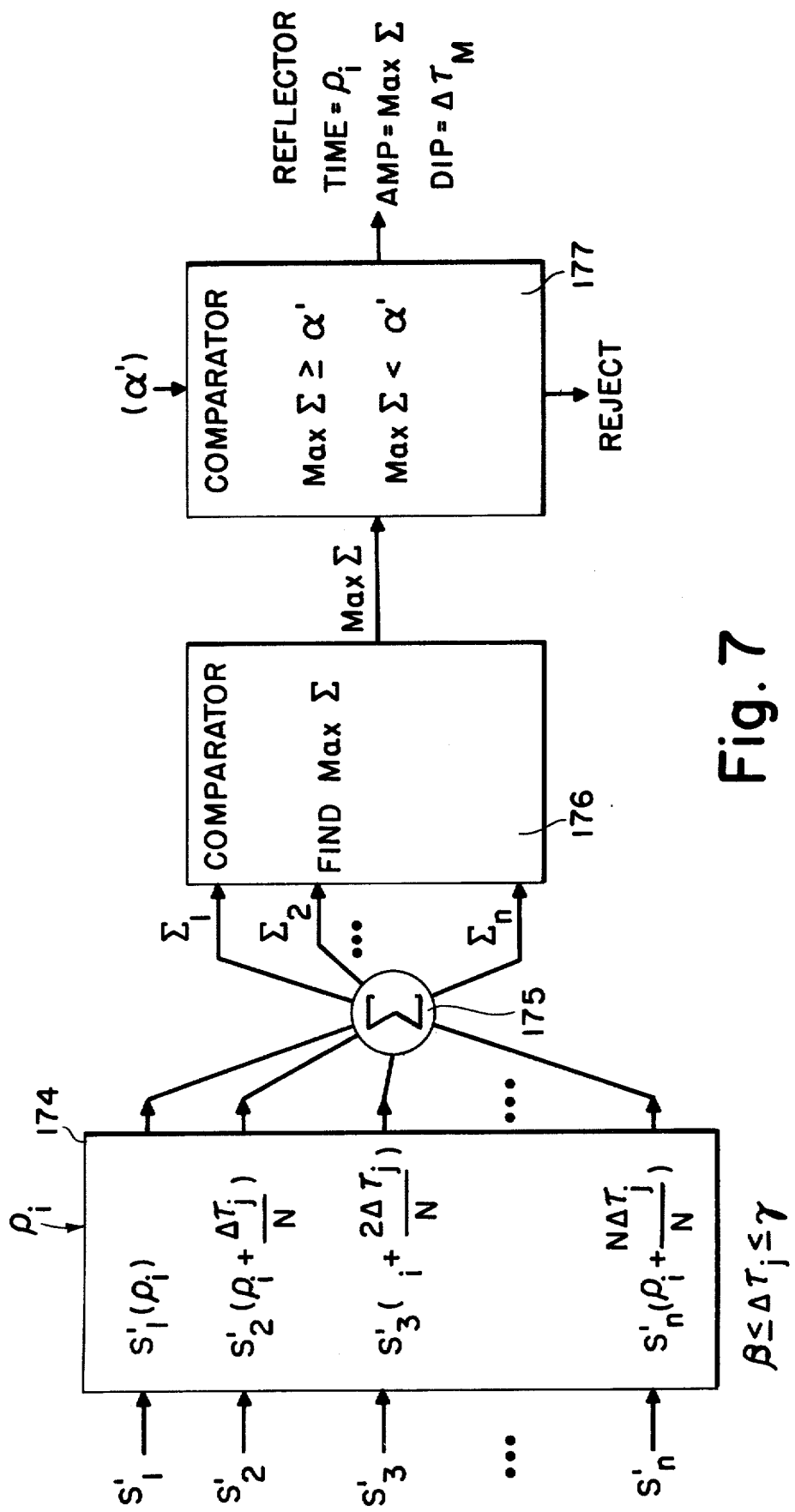
FIG. 7 shows another modification of the invention.

Another modification of the process of this invention is depicted in FIG. 7 and can be best understood with reference to this Figure together with FIGS. 7a and 8. In the process of FIG. 1 a key trace was searched for all reflections having an amplitude which exceeded a threshold level. This step is indicated at 39 in FIG. 1. After the occurrence times T of all reflections having an amplitude greater than the threshold level on the key trace have been determined, a lateral search is performed through adjacent traces to determine the attitude of the search line which produces the greatest sum. This is as indicated at 40 in FIG. 1. This technique has the disadvantage that if a particular reflecting interface does not produce a good reflection on the key trace, it will not be picked and followed. That is, if a particular reflection has a low amplitude on the key trace such that the threshold level $\alpha$ is not exceeded, the reflection will not be picked and followed even though particularly good reflections are produced on adjacent traces.

One technique of obviating this disadvantage is depicted in FIG. 7. In accordance with this technique, at each sampling interval on the key trace the adjacent traces are searched for a maximum amplitude along search lines having various attitudes. This can be better understood with reference to FIG. 7a wherein the top trace has been provided with a scale representing the sampling times 162, 163, 164 and so on. Commonly, the interval between these sampling times will be the interval between digital sample values. In accordance with this aspect of the invention the amplitudes of all adjacent traces are summed at the sampling time 162. Then, a summation is formed of the amplitudes of all adjacent traces along a search line having a different attitude. (In FIG. 7a the top trace is the key trace. The key trace is normally a center or end trace from the exploration spread. The number of adjacent traces will normally be six to twelve, but only five adjacent traces are shown in FIG. 7a). The summation is repeated for search lines of different attitudes. There is produced a plurality of sums which are compared in amplitude and the maximum is selected.

Referring to sampling time 165, two of these search lines at two different attitudes are shown. The search line 166 has a vertical attitude and the search line 173 has a sloping attitude. The sum of the reflection amplitudes along this line is formed. That is, the amplitudes at 167, 168, 169, 170, 171 and 172 are summed. Similarly, the sums of all amplitudes are obtained along other search lines including the search line 173. The sum of the amplitudes along the search line 173 will produce the largest sum. The value $\tau_m$ which is the time shift from one end trace to another, is stored as a value indicative of attitude.

Referring back to FIG. 7, the technique just described of selecting the amplitudes of adjacent traces along various search lines is indicated at 174. In FIG. 7 the various traces which are searched are denoted $S_1'$, $S_2'$, $S_3'$ ... $S_m'$. The sample times are denoted $\rho_i$ where i denotes an incrementally increasing index. The amplitude of the first trace at the occurrence time $\rho_i$ is denoted $S_1'(\rho_i)$. Similarly, the amplitude of the adjacent trace along a particular search line is denoted $$S_2'\left(\rho_i + \frac{\Delta\tau_j}{N}\right)$$

where N is the number of integrals between traces and $\Delta\tau_j$ is the total time shift of the search line from one end trace to another. In order to search along various search lines the value $\Delta\tau_j$ is incremented to increasing values. The summation of all of the amplitudes along various search lines is performed as indicated at 175. The various sums, $\Sigma_1, \Sigma_2 \ldots \Sigma_n$ are all compared one to another as indicated at 176 to find the maximum sum. The maximum sum, denoted Max$\Sigma$, is compared to a threshold value $\alpha'$ as indicated at 177. If the maximum exceeds the threshold level $\alpha'$ a reflection at this occurrence time on the key trace is indicated. The occurrence time on the key trace, $\rho_i$, is stored as indicative of time. The time shift from end trace to end trace of the search line producing the maximum sum $\Delta\tau_m$, is stored as indicative of dip, and the maximum sum, Max$\Sigma$, is stored as indicating the amplitude of the reflection.

The use of the modified technique of FIG. 7 has two advantages over the technique described in conjuction with FIG. 1. First, more reflections are plotted. The process doesn't miss events on the key trace because the reflection is not strong on the key trace.

Another advantage is that a better signal-to-noise ratio is obtained and hence a better representation of subsurface layering as determined by the seismogram is obtained. This may be better understood by considering the summation along various search lines as processing the output of an array of detectors. For an example, consider the summation of amplitudes of the six traces of FIG. 7a to be the generation of the output of a six-element array as the array is directed or pointed in different directions. A reflection is detected for a particular occurrence time and attitude, i.e. direction of the array, if the array output exceeds a certain threshold level. In FIG. 8 there is shown the response of an array as ordinate versus the spacing between the elements of an array as abscissa. In this case the spacing between the elements is $\Delta\tau_j/T$ where $\Delta\tau_j$ is the time shift from one end trace to another at a particular attitude and T is the period of a reflection. In FIG. 7a $\Delta\tau_j$ is shown for the search line 173 and T is shown as the period of the reflection on the top seismogram. A reflection having a $\Delta\tau_j/T$ falling between 0 and 1 or between 5 and 6 will contribute to the sum produced. A reflection having a $\Delta\tau_j/T$ which is between 1 and 5 will not contribute to the sum. However, the process depicted in FIG. 7 effectively steers the array through all values of $\Delta\tau_j/T$. Therefore, all reflections on all seismograms contribute to the sum. For this reason a better signal-to-noise ratio is produced.

Considering the reflection searching technique as the sweeping of a multi-element array, it will be apparent that areal arrays could be used as well as linear ones. That is, the search could be performed with three dimensional tilting as well as two dimensional tilting.

As previously discussed, the processes of the present invention can be performed in conjunction with the operation of various types of digital computers. These computers can be characterized by the block diagram shown in FIG. 9. Many of the aspects of this invention may be considered to be the new use of computing apparatus of the type shown in FIG. 9.

While various types of computing apparatus may be used, all of these operate on physical representations of data. In the appended claims, the words "physical representation" implies an operation by computing apparatus and excludes the performance of the step within the mind of the operator.

Figure 9:
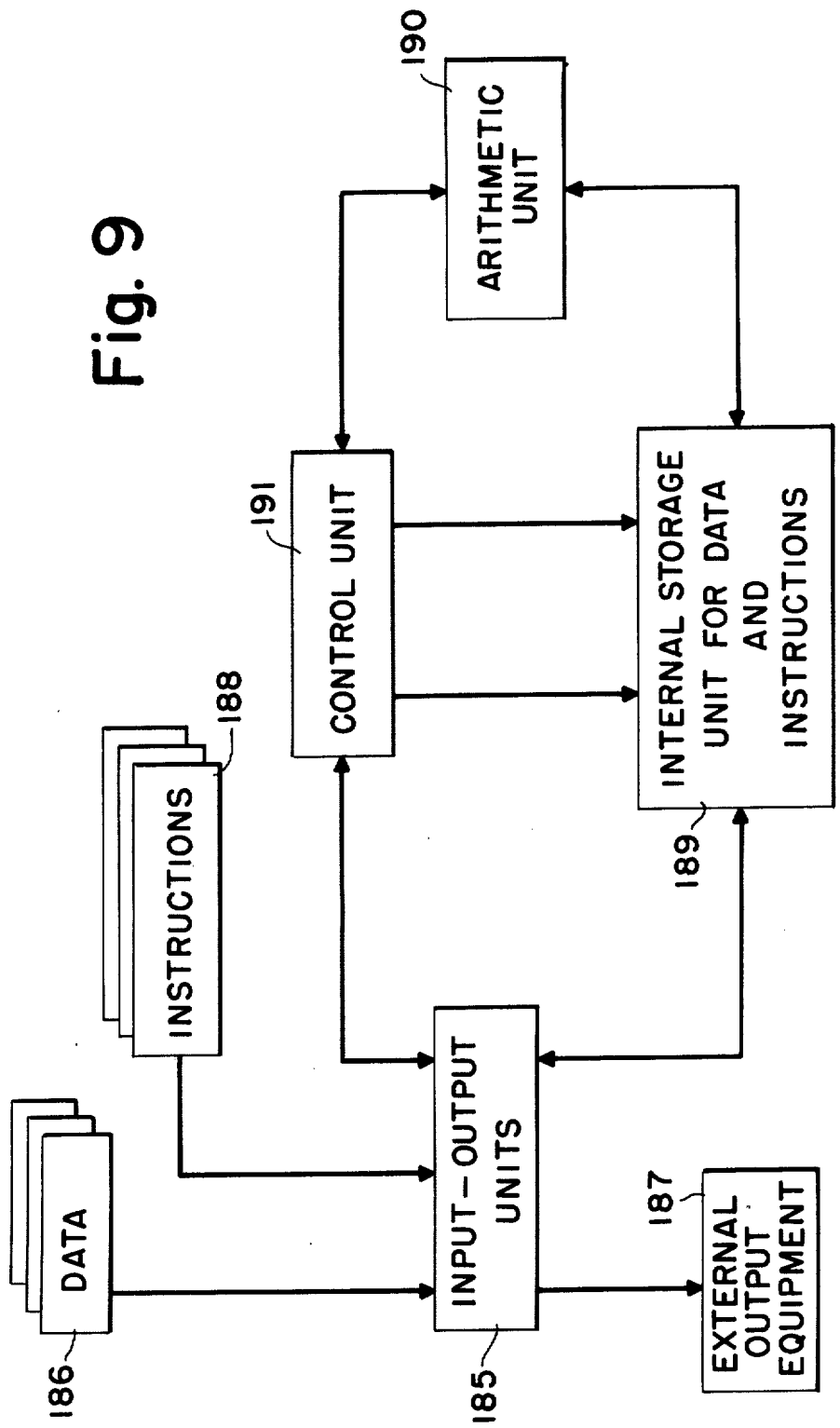
FIG. 9 shows a block diagram of computing apparatus which can be used in carrying out the invention.

In FIG. 9 there is shown an input-output unit 185 for accepting input data 186 and for producing as an output signals which can be utilized by external output equipment indicated at 187. The digital data processing system operates under control of instructions 188 which are fed into the computer through input-output unit 185. External data 186 and the instructions 188 are stored in the computer internal storage unit 189. These data and instructions are processed by arithmetic unit 190 under control of the control unit 191 which operates in accordance with the instructions 188.

While particular embodiments of the invention have been shown and described, it will, of course, be understood that various modifications may be made without departing from the principles of the invention. The appended claims are, therefore, intended to cover any such modifications within the true spirit and scope of the invention.

What is claimed is:

1. The method of operating automatic computing apparatus and automatic plotting means to produce a migrated seismic section from seismic data including a plurality of traces represented by values at periodic sampling times on each trace and representing the occurrence times of seismic energy from a plurality of spaced sources and reflected from subsurface interfaces comprising:

converting said seismic data to a first physical representation of the occurrence time of energy reflected from a particular subsurface interface and a second physical representation of the attitude of said particular subsurface interface, said converting including:

searching along search lines across adjacent traces at each sampling time on one of said traces, said search lines occurring at different attitudes corresponding with the arrival times of reflections from said subsurface interfaces, generating a function of said values of said adjacent traces along each of said search lines, and selecting the maximum of said function obtained from said generating operation, the attitudes of said search lines producing said maximum being said second physical representation indicating the arrival time versus distance of said particular subsurface interface, migrating said first physical representation of occurrence time and said second physical representation of attitude to values representing actual depth and horizontal displacement with respect to said source, and plotting said particular subsurface interface at the attitude and actual depth and horizontal displacement of said particular subsurface interface.

2. The method recited in claim 1 wherein said generating step includes:

adding the amplitudes of said values of said adjacent traces.

3. The new use of an automatic digital computer and automatic plotting means to produce a seismic section from seismic data including a plurality of traces represented by digital values at periodic sampling times on each trace and representing the occurrence times of seismic energy from a plurality of spaced sources and reflected from subsurface interfaces comprising:

converting said seismic data in said digital computer to a first physical representation of the occurrence time of energy reflected from a particular subsurface interface and a second physical representation of the attitude of said particular subsurface interface, said converting including:

searching along search lines across adjacent related traces at each sampling time on one of said traces, said search lines occurring at different attitudes corresponding with the arrival times of reflections from said subsurface interfaces, adding the amplitudes of the digital values of said adjacent traces along each of said search lines, and for each occurrence time, selecting the maximum sum obtained from said adding operation, the attitude of the search line producing said maximum sum being said second physical representation indicating the arrival time versus distance of said particular subsurface interface, plotting on said automatic plotting means said particular subsurface interface at the attitude represented by said second physical representation and the occurrence time represented by said first physical representation.

4. In seismic exploration wherein seismic data represent the occurrence times of seismic energy from a plurality of spaced sources and reflected from subsurface interfaces, the method of operating a system including automatic digital computing apparatus and automatic plotting means, said digital computing apparatus including:

an input unit for transforming said data to electric signals in a form which can be utilized by said computer, a storage unit for storing said electric signals, an arithmetic unit for operating upon said electric signals, and an output unit for transforming said electric signals into a form which can be utilized by said automatic plotting means, said method comprising:

transferring to said storage unit digital samples representing the traces of a plurality of digitized seismograms, summing in said arithmetic unit the amplitudes of digital samples of adjacent related traces occurring along search lines of various attitudes, for each occurrence time, storing in said storage unit the maximum sum obtained from said summing operation as indicative of the amplitude of a reflection on said seismograms, storing in said storage unit the attitude of the search line producing the maximum sum as indicative of the arrival time versus distance of the particular reflecting interface producing said reflection, storing in said storage unit the occurrence time of the search line producing the maximum sum as indicative of the depth of said particular reflecting interface, transferring the stored values indicative of depth and arrival time versus distance to said arithmetic unit to migrate them to values representing actual depth and horizontal displacement with respect to said sources, applying said values of arrival time versus distance, actual depth and actual horizontal displacement to said output unit for conversion to electric signals representing said dip, actual depth and actual horizontal displacement, applying said last-named electric signals to said automatic plotting means, and plotting said particular reflecting interface at the values of actual depth and actual horizontal displacement and with an attitude corresponding with the value of said arrival time versus distance.

5. The method recited in claim 4 further including:

applying said maximum sum to said arithmetic unit to divide said maximum sum by the number of traces included therein to determine maximum mean amplitude, and storing said maximum mean amplitude in said storage unit as an indication of the grade of reflections included in said sum.

6. The method recited in claim 4 further including:

applying said maximum sum to said arithmetic unit to compare said maximum sum with a threshold level indicating that reflections exist across said seismograms at the stored occurrence time on said traces and at the attitude of said search line producing said maximum sum.

7. The method recited in claim 4 wherein multiple reflections are removed from said seismic data further comprising:

adding in said digital computing apparatus physical representations of occurrence times to obtain all combinations of the sums of said occurrence times, adding in said digital computing apparatus physical representations of attitudes to obtain all combinations of the sums of said attitudes, comparing in said digital computing apparatus each physical representation of said occurrence times and each physical representation of said attitudes with each sum of occurrence times and each sum of attitudes respectively to determine correspondence, and rejecting in said digital computing apparatus physical representations of said occurrence times and attitudes which produce correspondence as being indicative of multiple reflections.

8. The method recited in claim 4 further including:

generating from said seismic data a plurality of physical representations of actual occurrence times for energy from successive ones of said spaced sources, generating from said seismic data a plurality of physical representations predictive of the occurrence times for energy from succeeding sources, comparing, for each succeeding source, said physical representations of actual occurrence times with said physical representations predictive of occurrence times, and interconnecting the plot of said particular subsurface interface between the occurrence time for energy from a particular source and the occurrence time for energy from the next succeeding source if said comparing step indicates agreement between predicted and actual occurrence time.

9. The new use of an automatic digital computer and automatic plotting means to produce a migrated seismic section from seismic data including a plurality of traces represented by digital values at periodic sampling times on each trace and representing the occurrence times of seismic energy from a plurality of spaced sources and reflected from subsurface interfaces comprising:
- adjusting the amplitude of each trace in said digital computer so that the rms level of each trace is equal for all traces,
- converting said seismic data in said digital computer to a first physical representation of the occurrence time of energy reflected from a particular subsurface interface and a second physical representation of the attitude of said particular subsurface interface,
- migrating in said digital computer said first physical representation of occurrence time and said second physical representation of attitude to values representating actual depth and horizontal displacement with respect to said sources, and
- plotting said particular subsurface interface at the attitude and actual depth and horizontal displacement of said particular subsurface interface.

10. The new use recited in claim 9 wherein multiple reflections are removed from said seismic data, said new use further comprising:
- adding in said digital computer physical representations of occurrence times to obtain all combinations of the sums of said occurrence times,
- adding in said digital computer physical representations of attitudes to obtain all combinations of the sums of said attitudes,
- comparing in said digital computer each physical representation of said occurrence times and each physical representation of said attitudes with each sum of occurrence times and each sum of attitudes respectively to determine correspondence, and
- rejecting in said digital computer physical representations of said occurrence times and attitudes which produce correspondence as being indicative of multiple reflections.

11. The new use recited in claim 9 further including:
- generating from said seismic data a plurality of physical representations of actual occurrence times for energy from successive ones of said spaced sources,
- generating from said seismic data a plurality of physical representations predictive of the occurence times for energy from succeeding sources,
- comparing, for each succeeding source, said physical representations of actual occurrence times with said physical representations predictive of occurrence times, and
- interconnecting the plot of said particular subsurface interface between the occurrence time for energy from a particular source and the occurrence time for energy from the next succeeding source if said comparing step indicates continuity.

12. The new use of apparatus for seismic exploration wherein seismic data represents the occurrence times of seismic energy from a plurality of spaced sources and reflected from subsurface interfaces, and wherein a migrated seismic depth section is produced from a seismic time section having lines of continuity through reflections from particular subsurface interfaces, said apparatus comprising:
- a curve following means,
- automatic digital computing means, and
- automatic plotting apparatus, said new use comprising:
  - following with said curve following means each line of continuity to generate at successive increments along said lines of continuity first signals representative of the occurrence times of reflected energy from particular interfaces and horizontal distances across said seismic time section,
  - applying said first signals to said digital computing means so that said digital computing means is responsive to said first signals for generating second signals representative of attitude, actual depth, and horizontal displacement with respect to said sources of successive points on the particular subsurface interfaces represented by said lines of continuity,
  - applying said second signals to said automatic plotting apparatus, said automatic plotting apparatus being responsive to said second signals for plotting said interfaces to produce said migrated seismic depth section.

13. The method of operating automatic digital computing apparatus and automatic plotting means to produce a seismic section from seismic data including a plurality of traces represented by values at periodic sampling times on each trace and representing the occurrence times of seismic energy from a plurality of spaced sources and reflected from subsurface interfaces comprising:
- converting said seismic data to a first physical representation of the occurrence time of energy reflected from a particular subsurface interface and a second physical representation of the attitude of said particular subsurface interface, said converting including:
  - searching along search lines across adjacent related traces at each sampling time on one of said traces, said search lines occurring at different attitudes corresponding with the arrival times of reflections from said subsurface interfaces,
  - adding the amplitudes of the values of said adjacent traces along each of said search lines, and
  - for each occurrence time, selecting the maximum sum obtained from said adding operation, the attitude of the search line producing said maximum sum being said second physical representation indicating the arrival time versus distance of said particular subsurface interface,
- plotting said particular subsurface interface at the attitude represented by said second physical representation and the occurrence time represented by said first physical representation.

14. The method of oprating automatic digital computing apparatus and automatic plotting means to produce a seismic section from seismic data including a plurality of traces represented by values at periodic sampling times on each trace and representing the occurrence times of seismic energy from a plurality of spaced sources and reflected from subsurface interfaces comprising:
- adjusting the amplitude of each trace so that the rms level of each trace is equal for all traces,
- searching a key trace for all amplitudes greater than a first threshold level,
- storing the occurrence times of those amplitudes greater than said first threshold level, searching along search lines across adjacent related traces at said stored occurrence times, said search lines occurring at various attitudes corresponding with the arrival times of reflections from said subsurface interfaces, adding the amplitudes of said adjacent traces along each of said search lines, for each occurrence time, selecting the maximum sum obtained from said adding operation, the attitude of the search line producing said maximum sum being converted to a first physical representation indicating the arrival time versus distance of a particular subsurface interface, converting said seismic data to a second physical representation of the occurrence time of energy reflected from said particular subsurface interface, migrating said second physical representation to values of actual depth and horizontal displacement with respect to said sources, and plotting said particular subsurface interface at the arrival time versus distance and actual depth and horizontal displacement of said particular subsurface interface.

15. The method of seismic exploration wherein seismic data represents the occurrence times of seismic energy from a plurality of spaced sources and reflected from subsurface interfaces, and wherein a migrated seismic depth section is produced from a seismic time section having lines of continuity through reflections from particular subsurface interfaces, the method of operating automatic computing apparatus, a curve follower, and automatic plotting means comprising:

following along each line of continuity to generate at successive increments along said lines of continuity first signals representative of the occurrence times of reflected energy from particular interfaces and horizontal distances across said seismic time section, generating, in response to said first signals, second signals representative of attitude, actual depth, and horizontal displacement with respect to said sources of successive points on the particular subsurface interfaces represented by said lines of continuity, and plotting, in response to said second signals, said interfaces to produce said migrated seismic depth section.

16. Apparatus for producing a migrated seismic section from seismic data including a plurality of traces represented by values at periodic sampling times on each trace and representing the occurrence times of seismic energy from a plurality of spaced sources and reflected from subsurface interfaces comprising:

means for searching along search lines across adjacent traces at each sampling time on one of said traces, said search lines occurring at different attitudes corresponding with the arrival times of reflections from said subsurface interfaces, means for generating a function of said values of said adjacent traces along each of said search lines, means for selecting the maximum of said function obtained from said generating operation, the attitudes of said search lines producing said maximum being second physical representation indicating the arrival time versus distance of said particular subsurface interface, means for migrating said first physical representation of occurrence time and said second physical representation of attitude to values representing actual depth and horizontal displacement with respect to said source, and a plotter for plotting said particular subsurface interface at the attitude and actual depth and horizontal displacement of said particular subsurface interface.

17. A system for seismic exploration wherein seismic data represent the occurrence times of seismic energy from a plurality of spaced sources and reflected from subsurface interfaces, said system including automatic digital computing apparatus and automatic plotting means, said digital computing apparatus including:

an input unit for transforming said data to electric signals in a form which can be utilized by said computer, means for transferring the stored values indicative of depth and arrival time versus distance to said arithmetic unit to migrate them to values representing actual depth and horizontal displacement with respect to said sources, means for applying said values of arrival time versus distance, actual depth and actual horizontal displacement to said output unit for conversion to electric signals representing said dip, actual depth and actual horizontal displacement, and means for applying said last-named electric signals to said automatic plotting means for plotting said particular reflecting interface at the values of actual depth and actual horizontal displacement and with an attitude corresponding with the value of said arrival time versus distance.

18. Apparatus for producing a migrated seismic section from seismic data including a plurality of traces represented by digital values at periodic sampling times on each trace and representing the occurrence times of seismic energy from a plurality of spaced sources and reflected from subsurface interfaces comprising:

means for adjusting the amplitude of each trace so that the rms level of each trace is equal for all traces, means for converting said seismic data to a first physical representation of the occurrence time of energy reflected from a particular subsurface interface and a second physical representation of the attitude of said particular subsurface interface, means for migrating said first physical representation of occurrence time and said second physical representation of attitude to values representing actual depth and horizontal displacement with respect to said sources, and means for plotting said particular subsurface interface at the attitude and actual depth and horizontal displacement of said particular subsurface interface.

* * * * *